United States Patent
Jin et al.

(10) Patent No.: US 10,448,241 B2
(45) Date of Patent: Oct. 15, 2019

(54) SERVICE PROCESSING METHOD, AND USER EQUIPMENT

(71) Applicant: Huawei Technologies Co., Ltd., Shenzhen, Guangdong (CN)

(72) Inventors: Hui Jin, Beijing (CN); Jian Yang, Beijing (CN); Xiaoyan Duan, Beijing (CN); Qiang Yi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/571,994

(22) PCT Filed: May 7, 2015

(86) PCT No.: PCT/CN2015/078490
§ 371 (c)(1),
(2) Date: Nov. 6, 2017

(87) PCT Pub. No.: WO2016/176862
PCT Pub. Date: Nov. 10, 2016

(65) Prior Publication Data
US 2018/0091970 A1    Mar. 29, 2018

(51) Int. Cl.
*H04W 4/16* (2009.01)
*H04W 8/18* (2009.01)
(Continued)

(52) U.S. Cl.
CPC .......... *H04W 8/183* (2013.01); *H04L 65/1059* (2013.01); *H04L 65/40* (2013.01); *H04L 67/16* (2013.01); *H04W 4/16* (2013.01)

(58) Field of Classification Search
CPC .... H04W 8/183; H04W 4/16; H04L 65/1065; H04L 65/40; H04L 67/16
(Continued)

(56) References Cited

U.S. PATENT DOCUMENTS

| 5,956,633 | A  | * | 9/1999  | Janhila  | H04W 12/12 455/410     |
|-----------|----|---|---------|----------|------------------------|
| 6,311,055 | B1 | * | 10/2001 | Boltz    | H04M 1/66 455/414.1    |
| 7,356,337 | B2 | * | 4/2008  | Florence | H04M 1/274516 455/432.2|
| 7,369,848 | B2 | * | 5/2008  | Jiang    | H04W 8/183 370/331     |

(Continued)

FOREIGN PATENT DOCUMENTS

| CN | 101064940 A | 10/2007 |
|----|-------------|---------|
| CN | 101115224 A | 1/2008  |
| CN | 101588349 A | 11/2009 |

OTHER PUBLICATIONS

"3rd Generation Partnership Project; Technical Specification Group Services and System Aspects; Supporting Globally Routable User Agent URI in IMS; Report and Conclusions (Release 7)"; 3GPP TR 23.808 V1.0.1; May 2006; 17 pages.

(Continued)

*Primary Examiner* — Hai V Nguyen
(74) *Attorney, Agent, or Firm* — Kilpatrick Townsend & Stockton, LLP

(57) ABSTRACT

Embodiments of the present disclosure relate to the field of electronic terminal technologies, and provide a service processing method. A specific solution is: registering, by user equipment, with an IMS network by using a first IMSI corresponding to a first telephone card, and obtaining a first GRUU; and if the user equipment saves a mapping relationship between the first IMSI and a second GRUU, and the second GRUU and the first GRUU have a same IMPU, configuring, by the user equipment, a first supplementary service to a supplementary service the same as a second supplementary service, where the first supplementary service is a supplementary service corresponding to the first GRUU, and the second supplementary service is a supplementary service corresponding to the second GRUU. The embodiments of the present disclosure are used for service processing.

20 Claims, 17 Drawing Sheets

(51) Int. Cl.
*H04L 29/08* (2006.01)
*H04L 29/06* (2006.01)

(58) Field of Classification Search
USPC .................................................. 455/558, 407
See application file for complete search history.

(56) References Cited

U.S. PATENT DOCUMENTS

| | | | | |
|---|---|---|---|---|
| 7,505,769 B2* | 3/2009 | Jiang | ..................... | H04W 8/183 455/411 |
| 7,577,431 B2* | 8/2009 | Jiang | ..................... | H04W 8/26 455/413 |
| 7,610,328 B2* | 10/2009 | Haase | ..................... | H04W 8/18 709/201 |
| 7,668,159 B2* | 2/2010 | Buckley | ............ | H04L 29/06027 370/352 |
| 7,742,763 B2* | 6/2010 | Jiang | ..................... | H04W 8/18 370/338 |
| 7,760,712 B2* | 7/2010 | Buckley | ................ | H04M 7/123 370/353 |
| 7,796,990 B2* | 9/2010 | Matuszewski | ........ | H04L 63/126 370/395.21 |
| 7,995,565 B2* | 8/2011 | Buckley | ................. | H04L 12/66 370/353 |
| 8,090,830 B2* | 1/2012 | Buckley | ............ | H04L 61/3085 709/226 |
| 8,160,559 B2* | 4/2012 | Buckley | ................ | H04W 28/06 370/352 |
| 8,165,573 B2* | 4/2012 | Buckley | ................ | H04W 28/06 370/352 |
| 8,195,155 B2* | 6/2012 | Terrill | ................. | H04L 67/306 455/433 |
| 8,249,561 B2* | 8/2012 | Bakker | ............... | H04L 65/1016 370/259 |
| 8,266,302 B2* | 9/2012 | Przybysz | .......... | H04L 29/06027 709/228 |
| 8,340,017 B2* | 12/2012 | Buckley | ................ | H04W 28/06 370/328 |
| 8,401,002 B2* | 3/2013 | Allen | ..................... | H04L 67/14 370/352 |
| 8,463,264 B2* | 6/2013 | Alriksson | ......... | H04L 29/12311 455/435.1 |
| 8,521,170 B2* | 8/2013 | Buckley | ............... | H04Q 3/0045 455/445 |
| 8,537,797 B2* | 9/2013 | Narkar | .................... | H04W 8/00 370/338 |
| 8,542,678 B2* | 9/2013 | Buckley | ............... | H04M 7/123 370/353 |
| 8,671,201 B2* | 3/2014 | Keller | ................. | H04W 36/0022 709/227 |
| 8,718,688 B2* | 5/2014 | Shaheen | ................. | H04W 4/00 455/466 |
| 8,811,288 B2* | 8/2014 | Lindholm | ................ | H04W 76/16 370/328 |
| 8,849,963 B2* | 9/2014 | Camarillo Gonzalez | .................... | H04L 67/24 709/203 |
| 8,954,542 B2* | 2/2015 | Parsons | ............... | H04L 65/1073 709/203 |
| 9,002,320 B2* | 4/2015 | Jiang | ..................... | H04M 15/00 379/114.14 |
| 9,049,121 B2* | 6/2015 | Allen | ..................... | H04L 67/14 |
| 9,215,143 B2* | 12/2015 | Allen | ..................... | H04L 67/14 |
| 9,215,256 B2* | 12/2015 | Suryavanshi | ........ | H04L 65/1073 |
| 9,271,251 B2* | 2/2016 | Narkar | .................... | H04W 8/00 |
| 9,294,332 B2* | 3/2016 | Kim | ................... | H04L 65/1016 |
| 9,306,986 B2* | 4/2016 | Kim | ................... | H04L 65/4015 |
| 9,332,041 B2* | 5/2016 | Bakker | ................... | H04W 4/90 |
| 9,426,301 B2* | 8/2016 | Allen | ..................... | H04L 67/14 |
| 9,681,000 B2* | 6/2017 | Allen | ..................... | H04L 67/14 |
| 9,681,412 B2* | 6/2017 | Das | ................... | H04W 60/005 |
| 9,787,726 B2* | 10/2017 | Russell | ............... | H04L 65/1016 |
| 9,794,769 B2* | 10/2017 | Dubesset | ................ | H04W 8/12 |
| 9,820,251 B2* | 11/2017 | Narkar | .................... | H04W 8/00 |
| 9,871,713 B2* | 1/2018 | Forsberg | ............ | H04L 65/1016 |
| 9,913,235 B2* | 3/2018 | Allen | .................... | H04M 7/123 |
| 10,136,454 B2* | 11/2018 | Klein | ................... | H04L 65/1016 |
| 2004/0122931 A1* | 6/2004 | Rowland | ........... | H04L 29/12254 709/223 |
| 2005/0070278 A1* | 3/2005 | Jiang | ..................... | H04W 8/183 455/432.3 |
| 2005/0278420 A1* | 12/2005 | Hartikainen | ............ | H04L 63/08 709/203 |
| 2006/0018272 A1* | 1/2006 | Mutikainen | ....... | H04L 29/12009 370/328 |
| 2006/0276226 A1* | 12/2006 | Jiang | ..................... | H04W 8/183 455/558 |
| 2006/0281492 A1* | 12/2006 | Jiang | ..................... | H04Q 3/0025 455/558 |
| 2007/0002831 A1* | 1/2007 | Allen | ..................... | H04L 67/14 370/352 |
| 2007/0076760 A1* | 4/2007 | Wennberg | ............. | H04W 8/205 370/477 |
| 2007/0238466 A1* | 10/2007 | Buckley | ............... | H04Q 3/0045 455/445 |
| 2007/0238467 A1* | 10/2007 | Buckley | ............... | H04Q 3/0045 455/445 |
| 2007/0238468 A1* | 10/2007 | Buckley | ............... | H04Q 3/0045 455/445 |
| 2007/0274301 A1* | 11/2007 | Mutikainen | ....... | H04L 29/12594 370/357 |
| 2007/0281691 A1* | 12/2007 | Svensson | ............. | H04W 8/265 455/435.1 |
| 2008/0070543 A1* | 3/2008 | Matuszewski | ........ | H04L 63/126 455/404.1 |
| 2008/0080480 A1* | 4/2008 | Buckley | .................. | H04L 12/66 370/352 |
| 2008/0123625 A1* | 5/2008 | Buckley | ................ | H04M 7/123 370/352 |
| 2008/0176538 A1* | 7/2008 | Terrill | .................... | H04L 67/306 455/414.1 |
| 2008/0189414 A1* | 8/2008 | Astrom | .................... | H04L 29/06 709/225 |
| 2008/0267171 A1* | 10/2008 | Buckley | ............ | H04L 29/06027 370/352 |
| 2008/0293408 A1* | 11/2008 | Jiang | ..................... | H04W 8/183 455/433 |
| 2008/0298351 A1* | 12/2008 | Buckley | ................ | H04W 28/06 370/355 |
| 2008/0299958 A1* | 12/2008 | Buckley | ................ | H04W 28/06 455/417 |
| 2008/0299980 A1* | 12/2008 | Buckley | ................ | H04W 28/06 455/445 |
| 2009/0003358 A1* | 1/2009 | Son | ........................ | H04L 51/38 370/401 |
| 2009/0005008 A1* | 1/2009 | Son | ........................ | H04L 51/14 455/412.1 |
| 2009/0006562 A1* | 1/2009 | Son | ..................... | H04L 65/1016 709/206 |
| 2009/0068996 A1* | 3/2009 | Bakker | ............... | H04L 65/1016 455/414.1 |
| 2009/0131022 A1* | 5/2009 | Buckley | ................. | H04L 51/38 455/412.1 |
| 2009/0150562 A1* | 6/2009 | Kim | ........................ | H04N 7/173 709/238 |
| 2009/0178005 A1* | 7/2009 | Jheng | .................... | G06F 3/0482 715/825 |
| 2009/0257417 A1* | 10/2009 | Allen | ..................... | H04W 76/22 370/338 |
| 2009/0257418 A1* | 10/2009 | Allen | ..................... | H04M 7/123 370/338 |
| 2010/0009704 A1* | 1/2010 | Fan | ..................... | H04L 65/1006 455/466 |
| 2010/0034168 A1* | 2/2010 | Mahdi | .................. | H04W 36/14 370/331 |
| 2010/0046501 A1* | 2/2010 | Witzel | .................... | H04W 8/06 370/352 |

(56) References Cited

U.S. PATENT DOCUMENTS

| | | | |
|---|---|---|---|
| 2010/0056119 A1* | 3/2010 | Shaffer | H04M 3/42042 455/415 |
| 2010/0088421 A1* | 4/2010 | Przybysz | H04L 29/06027 709/228 |
| 2010/0174819 A1* | 7/2010 | Huang | H04W 60/04 709/227 |
| 2010/0182998 A1* | 7/2010 | Nakada | H04W 48/18 370/352 |
| 2010/0199330 A1* | 8/2010 | Schott | H04L 65/1073 726/4 |
| 2010/0246780 A1* | 9/2010 | Bakker | H04W 4/90 379/38 |
| 2010/0272088 A1* | 10/2010 | Buckley | H04M 7/123 370/338 |
| 2010/0312832 A1* | 12/2010 | Allen | H04L 65/1016 709/204 |
| 2010/0312897 A1* | 12/2010 | Allen | H04L 12/1822 709/227 |
| 2010/0325248 A1* | 12/2010 | Camarillo Gonzalez | H04L 67/16 709/220 |
| 2010/0325306 A1* | 12/2010 | Vimpari | H04L 29/12471 709/233 |
| 2011/0032906 A1* | 2/2011 | Mutikainen | H04L 29/12584 370/331 |
| 2011/0040836 A1* | 2/2011 | Allen | H04L 65/1093 709/205 |
| 2011/0092253 A1* | 4/2011 | Amiel | H04W 8/265 455/558 |
| 2011/0124339 A1* | 5/2011 | Alriksson | H04L 29/12311 455/435.1 |
| 2011/0161508 A1* | 6/2011 | Kim | H04L 65/4015 709/228 |
| 2011/0188416 A1* | 8/2011 | Faccin | H04W 76/10 370/310 |
| 2011/0188446 A1* | 8/2011 | Bienas | H04W 74/00 370/328 |
| 2011/0189971 A1* | 8/2011 | Faccin | H04W 76/10 455/404.1 |
| 2011/0194554 A1* | 8/2011 | Gavita | H04L 65/1016 370/352 |
| 2011/0197058 A1 | 8/2011 | Mayer et al. | |
| 2011/0238845 A1* | 9/2011 | Keller | H04W 36/0022 709/227 |
| 2011/0307559 A1* | 12/2011 | Son | H04L 12/1859 709/206 |
| 2012/0039312 A1* | 2/2012 | Narkar | H04W 8/00 370/338 |
| 2012/0042396 A1* | 2/2012 | Guerra | G06F 21/88 726/30 |
| 2012/0099715 A1* | 4/2012 | Ravishankar | H04L 12/1407 379/114.01 |
| 2012/0115432 A1* | 5/2012 | Blanco | H04W 4/90 455/404.1 |
| 2012/0115477 A1* | 5/2012 | Ali | H04L 65/1073 455/435.1 |
| 2012/0166652 A1* | 6/2012 | Bouthemy | H04L 65/1016 709/227 |
| 2012/0173736 A1* | 7/2012 | Klein | H04L 29/12764 709/227 |
| 2012/0202550 A1* | 8/2012 | Marsico | H04W 8/08 455/515 |
| 2012/0236871 A1* | 9/2012 | Wallace | H04L 61/10 370/401 |
| 2012/0265849 A1 | 10/2012 | Bakker et al. | |
| 2013/0017862 A1* | 1/2013 | Lee | H04W 60/005 455/558 |
| 2013/0021998 A1* | 1/2013 | Shatsky | H04W 28/26 370/329 |
| 2013/0036183 A1* | 2/2013 | Lu | H04L 51/28 709/206 |
| 2013/0156025 A1* | 6/2013 | Allen | H04L 67/14 370/352 |
| 2013/0208676 A1* | 8/2013 | Klein | H04L 65/1016 370/329 |
| 2013/0279373 A1* | 10/2013 | Ding | H04M 15/56 370/259 |
| 2013/0279406 A1* | 10/2013 | Merino Vazquez | H04M 15/66 370/328 |
| 2013/0310027 A1* | 11/2013 | Foti | H04W 8/02 455/432.1 |
| 2013/0322312 A1* | 12/2013 | Kim | H04L 65/1016 370/310 |
| 2014/0086143 A1* | 3/2014 | Foti | H04W 4/70 370/328 |
| 2014/0086144 A1* | 3/2014 | Foti | H04L 61/106 370/328 |
| 2014/0086147 A1* | 3/2014 | Narkar | H04W 8/00 370/328 |
| 2014/0226535 A1* | 8/2014 | Forsberg | H04M 3/4217 370/259 |
| 2014/0297220 A1* | 10/2014 | Raffa | B60N 2/002 702/150 |
| 2015/0055550 A1* | 2/2015 | Suryavanshi | H04W 60/00 370/328 |
| 2015/0055653 A1* | 2/2015 | Suryavanshi | H04L 65/1073 370/392 |
| 2015/0120947 A1* | 4/2015 | Guo | H04L 65/1016 709/228 |
| 2015/0142957 A1* | 5/2015 | Forsberg | H04L 65/1016 709/224 |
| 2015/0172471 A1* | 6/2015 | Castro Castro | H04W 76/10 370/329 |
| 2015/0229491 A1* | 8/2015 | Solovyev | H04L 12/66 370/328 |
| 2015/0237148 A1* | 8/2015 | Baudouin | H04L 67/146 709/219 |
| 2015/0245186 A1* | 8/2015 | Park | H04W 4/80 455/417 |
| 2015/0304170 A1* | 10/2015 | Allen | H04L 67/14 370/352 |
| 2015/0312281 A1* | 10/2015 | Martinez | H04L 65/1016 709/228 |
| 2015/0312295 A1* | 10/2015 | Allen | H04L 12/1822 709/204 |
| 2015/0312874 A1* | 10/2015 | Das | H04W 60/005 455/435.1 |
| 2015/0319588 A1* | 11/2015 | Lim | H04W 4/14 455/466 |
| 2016/0057607 A1* | 2/2016 | Dubesset | H04W 8/12 455/433 |
| 2016/0150090 A1* | 5/2016 | Allen | H04L 67/14 370/352 |
| 2016/0183178 A1* | 6/2016 | Marimuthu | H04W 4/023 455/432.1 |
| 2016/0212177 A1* | 7/2016 | Xu | H04L 65/1069 |
| 2016/0226922 A1* | 8/2016 | Russell | H04L 65/1016 |
| 2016/0249313 A1* | 8/2016 | Narkar | H04W 8/00 |
| 2016/0295544 A1* | 10/2016 | Jiang | H04L 5/0053 |
| 2016/0315978 A1* | 10/2016 | Jacobsohn | H04L 65/1016 |
| 2016/0381230 A1* | 12/2016 | Allen | H04L 67/14 370/352 |
| 2017/0237782 A1* | 8/2017 | Shen | H04L 65/1016 455/435.1 |
| 2017/0289102 A1* | 10/2017 | Allen | H04L 67/14 |
| 2018/0070328 A1* | 3/2018 | Narkar | H04W 8/00 |

OTHER PUBLICATIONS

S2-070165, "Application of temporary GRUUs to IMS", 3GPP TSG SA WG2 Architecture-S2#56, Florence, Italy, Jan. 15-19, 2007, total 2 pages.

* cited by examiner

SERVICE PROCESSING METHOD, AND USER EQUIPMENT

CROSS-REFERENCE TO RELATED APPLICATIONS

This application is a national stage of International Application No. PCT/CN2015/078490, filed on May 7, 2015, which is hereby incorporated by reference in its entirety.

TECHNICAL FIELD

The present disclosure relates to the field of electronic terminal technologies, and in particular, to a service processing method, and user equipment.

BACKGROUND

An Internet Protocol (IP) multimedia subsystem (IMS) is a network system that provides voice and multimedia services based on an IP network. In an IMS network, as a calling number, an IP multimedia public identity (IMPU) may correspond to a user having at least one terminal, that is, one IMPU may correspond to multiple terminals, and one terminal may correspond to multiple IMPUs. In the IMS network, multiple terminals corresponding to an IMPU may be called by using the IMPU. The terminal herein may be an intelligent communications module in the IMS network, and generally is a telephone card, for example, a subscriber identity module, a universal integrated circuit card, or a universal subscriber identity module. An international mobile subscriber identity (IMSI) may uniquely identify a telephone card, but the IMSI cannot be used as a calling number in the IMS network. To call a particular terminal in at least one terminal corresponding to the IMPU, a globally routable user agent uniform resource identifier (GRUU) is introduced in the IMS system. When registered in the IMS network, each terminal is allocated one unique calling number GRUU. Therefore, a terminal identified by a GRUU may be called uniquely by calling the GRUU in the IMS network. The GRUU includes an IMPU and an international mobile equipment identity (IMEI). An IMEI uniquely identifies single card user equipment having only one card slot, that is, single card user equipment into which only one telephone card can be inserted. When user equipment has multiple card slots, an IMEI uniquely identifies one card slot.

In addition to normal services such as phone call, short message service, and fax, the IP-based voice services provided by the IMS system may further include supplementary services such as call transfer, call barring, and call waiting. When a user configures a supplementary service, the user may send a supplementary service configuration request to a server in the IMS network, for example, a telephone application service, to configure a supplementary service corresponding to a GRUU. The telephony application server saves the supplementary service configured by the user in the supplementary service configuration request. For example, the supplementary service configured by the user may be barring a call from GRUU-1, that is, barring a call from a telephone card identified by GRUU-1. When an IMPU does not change, because an IMEI in a GRUU corresponds to a card slot, when a card slot into which a telephone card is inserted changes, a GRUU obtained after registration is performed in the IMS network by using the telephone card also changes, that is, a correspondence between the telephone card and the GRUU changes. In this way, an error may occur in a correspondence between the supplementary service that corresponds to the GRUU and that is saved in the telephony application server and the telephone card, causing an error to the supplementary service of the telephone card.

SUMMARY

Embodiments of the present disclosure provide a service processing method, and user equipment, to resolve a problem in the prior art that because when an IMPU does not change, a card slot into which a telephone card is inserted changes, and a corresponding GRUU changes, a supplementary service that corresponds to the changed GRUU and that is saved in a server does not correspond to the telephone card, a supplementary service error of the telephone card is caused.

To achieve the foregoing objective, the following technical solutions are used in the embodiments of the present disclosure.

According to a first aspect, a service processing method is provided, where the method is applied to user equipment including at least one telephone card, and the method includes:

registering, by user equipment, with an Internet Protocol IP multimedia subsystem IMS network by using a first international mobile subscriber identity IMSI corresponding to a first telephone card, and obtaining a first globally routable user agent uniform resource identifier GRUU; and if the user equipment saves a mapping relationship between the first IMSI and a second GRUU, and the second GRUU and the first GRUU have a same Internet Protocol IP multimedia public identity IMPU, configuring, by the user equipment, a first supplementary service to a supplementary service the same as a second supplementary service, where the first supplementary service is a supplementary service corresponding to the first GRUU, and the second supplementary service is a supplementary service corresponding to the second GRUU.

With reference to the first aspect, in a first possible implementation manner of the first aspect, the configuring, by the user equipment, a first supplementary service to a supplementary service the same as a second supplementary service includes:

querying, by the user equipment, a server for the second supplementary service, and saving the second supplementary service;

sending, by the user equipment, a first deletion instruction to the server, to instruct the server to delete the first supplementary service currently saved in the server;

configuring, by the user equipment by using the server according to the saved second supplementary service, the first supplementary service to the supplementary service the same as the second supplementary service; and deleting, by the user equipment, the saved second supplementary service.

With reference to the first aspect or the first possible implementation manner of the first aspect, in a second possible implementation manner of the first aspect, before the configuring, by the user equipment, a first supplementary service to a supplementary service the same as a second supplementary service, the method further includes:

if the user equipment further saves a mapping relationship between a second IMSI corresponding to a second telephone card and the first GRUU, querying the server for the first supplementary service; and saving, by the user equipment, a first mapping relationship, where the first mapping relationship is a mapping relationship among the second IMSI, the first GRUU, and the first supplementary service.

With reference to the second possible implementation manner of the first aspect, in a third possible implementation manner of the first aspect, after the configuring, by the user equipment, a first supplementary service to a supplementary service the same as a second supplementary service, the method further includes:

if the user equipment registers with the IMS network by using the second IMSI, and obtains the second GRUU, sending, by the user equipment, a second deletion instruction to the server, to instruct the server to delete the second supplementary service currently saved in the server; and configuring, by the user equipment by using the server, the second supplementary service to a supplementary service the same as the first supplementary service in the first mapping relationship.

With reference to the third possible implementation manner of the first aspect, in a fourth possible implementation manner of the first aspect, the method further includes:

after configuring the second supplementary service to the supplementary service the same as the first supplementary service in the first mapping relationship, deleting, by the user equipment, the first supplementary service in the first mapping relationship; and updating, by the user equipment, the mapping relationship between the second IMSI and the first GRUU to a mapping relationship between the second IMSI and the second GRUU.

With reference to the first or the second possible implementation manner of the first aspect, in a fifth possible implementation manner of the first aspect, after the querying, by the user equipment, a server for the second supplementary service, and saving the second supplementary service, the method further includes:

sending, by the user equipment, a second deletion instruction to the server, to instruct the server to delete the second supplementary service.

With reference to any one of the first aspect to the fifth possible implementation manner of the first aspect, in a sixth possible implementation manner of the first aspect, the method further includes:

updating, by the user equipment, the mapping relationship between the first IMSI and the second GRUU to a mapping relationship between the first IMSI and the first GRUU.

With reference to the first aspect, in a seventh possible implementation manner of the first aspect, after the obtaining, by user equipment, a first GRUU, the method further includes:

if the user equipment does not save a mapping relationship between the first IMSI and any GRUU, and the GRUU includes the first GRUU and the second GRUU, saving, by the user equipment, a mapping relationship between the first IMSI and the first GRUU.

With reference to the first aspect, in an eighth possible implementation manner of the first aspect, the configuring, by the user equipment, a first supplementary service to a supplementary service the same as a second supplementary service includes:

if the user equipment saves a second mapping relationship, and the second mapping relationship is a mapping relationship among the first IMSI, the second GRUU, and the second supplementary service, sending, by the user equipment, a first deletion instruction to a server, to instruct the server to delete the first supplementary service currently saved in the server; and configuring, by the user equipment by using the server, the first supplementary service to the supplementary service the same as the second supplementary service in the second mapping relationship.

With reference to the eighth possible implementation manner of the first aspect, in a ninth possible implementation manner of the first aspect, after the configuring, by the user equipment, the first supplementary service to the supplementary service the same as the second supplementary service in the second mapping relationship, the method further includes:

updating, by the user equipment, the second mapping relationship to a third mapping relationship, where the third mapping relationship is a mapping relationship among the first IMSI, the first GRUU, and the first supplementary service.

With reference to the eighth or the ninth possible implementation manner of the first aspect, in a tenth possible implementation manner of the first aspect, the method further includes:

if the user equipment further saves a first mapping relationship, and the first mapping relationship is a mapping relationship among a second IMSI, the first GRUU, and the first supplementary service, when the user equipment performs registration by using the second IMSI and obtains the second GRUU, sending a second deletion instruction to the server, to instruct the server to delete the second supplementary service currently saved in the server;

configuring, by the user equipment by using the server, the second supplementary service to a supplementary service the same as the first supplementary service in the first mapping relationship; and updating, by the user equipment, the first mapping relationship to a fourth mapping relationship, where the fourth mapping relationship is a mapping relationship among the second IMSI, the second GRUU, and the second supplementary service.

With reference to the eighth or the ninth possible implementation manner of the first aspect, in an eleventh possible implementation manner of the first aspect, the method further includes:

sending, by the user equipment, a second deletion instruction to the server, to instruct the server to delete the second supplementary service currently saved in the server.

With reference to the first aspect, in a twelfth possible implementation manner of the first aspect, if the user equipment does not save a mapping relationship between the first IMSI and any GRUU, and the GRUU includes the first GRUU and the second GRUU, when configuring the first supplementary service corresponding to the first IMSI, the user equipment saves a third mapping relationship, where the third mapping relationship is a mapping relationship among the first IMSI, the first GRUU, and the first supplementary service.

According to a second aspect, user equipment is provided, including:

an obtaining unit, configured to: register with an Internet Protocol IP multimedia subsystem IMS network by using a first international mobile subscriber identity IMSI corresponding to a first telephone card, and obtain a first globally routable user agent uniform resource identifier GRUU; and a configuration unit, configured to: after the obtaining unit obtains the first GRUU, if the user equipment saves a mapping relationship between the first IMSI and a second GRUU, and the second GRUU and the first GRUU have a same Internet Protocol IP multimedia public identity IMPU, configure the first supplementary service to a supplementary service the same as a second supplementary service, where the first supplementary service is a supplementary service corresponding to the first GRUU, and the second supplementary service is a supplementary service corresponding to the second GRUU.

With reference to the second aspect, in a first possible implementation manner of the second aspect, the configuring unit is specifically configured to:

query a server for the second supplementary service and save the second supplementary service;

send a first deletion instruction to the server, to instruct the server to delete the first supplementary service currently saved in the server;

configure, by using the server according to the saved second supplementary service, the first supplementary service to the supplementary service the same as the second supplementary service; and delete the saved second supplementary service.

With reference to the second aspect or the first possible implementation manner of the second aspect, in a second possible implementation manner of the second aspect, the user equipment further includes:

a query unit, configured to: before the configuration unit configures the first supplementary service to the supplementary service the same as the second supplementary service, if the user equipment further saves a mapping relationship between a second IMSI corresponding to a second telephone card and the first GRUU, query the server for the first supplementary service; and a first storage unit, configured to: when the query unit obtains through querying the first supplementary service, save a first mapping relationship, where the first mapping relationship is a mapping relationship among the second IMSI, the first GRUU, and the first supplementary service.

With reference to the second possible implementation manner of the second aspect, in a third possible implementation manner of the second aspect, the user equipment further includes:

a sending unit, configured to: after the configuration unit configures the first supplementary service to the supplementary service the same as the second supplementary service, if the user equipment registers with the IMS network by using the second IMSI and obtains the second GRUU, send a second deletion instruction to the server, to instruct the server to delete the second supplementary service currently saved in the server, where the configuration unit is further configured to configure, by using the server, the second supplementary service to the supplementary service the same as the first supplementary service in the first mapping relationship.

With reference to the third possible implementation manner of the second aspect, in a fourth possible implementation manner of the second aspect, the user equipment further includes:

a first deletion unit, configured to: after the configuration unit configures the second supplementary service to the supplementary service the same as the first supplementary service in the first mapping relationship, delete the first supplementary service in the first mapping relationship; and a first update unit, configured to update the mapping relationship between the second IMSI and the first GRUU to a mapping relationship between the second IMSI and the second GRUU.

With reference to the first or the second possible implementation manner of the second aspect, in a fifth possible implementation manner of the second aspect, the user equipment further includes:

a sending unit, configured to: after the configuration unit queries the server for the second supplementary service and saves the second supplementary service, send a second deletion instruction to the server, to instruct the server to delete the second supplementary service.

With reference to any one of the second aspect to the fifth possible implementation manner of the second aspect, in a sixth possible implementation manner of the second aspect, the user equipment further includes:

a second update unit, configured to update the mapping relationship between the first IMSI and the second GRUU to a mapping relationship between the first IMSI and the first GRUU.

With reference to the second aspect, in a seventh possible implementation manner of the second aspect, the user equipment further includes:

a second storage unit, configured to: after the obtaining unit obtains the first GRUU, if the user equipment does not save a mapping relationship between the first IMSI and any GRUU, and the GRUU includes the first GRUU and the second GRUU, save a mapping relationship between the first IMSI and the first GRUU.

With reference to the second aspect, in an eighth possible implementation manner of the second aspect, the configuring unit is specifically configured to:

if the user equipment saves a second mapping relationship, and the second mapping relationship is a mapping relationship among the first IMSI, the second GRUU, and the second supplementary service, send a first deletion instruction to a server, to instruct the server to delete the first supplementary service currently saved in the server; and configure, by using the server, the first supplementary service to the supplementary service the same as the second supplementary service in the second mapping relationship.

With reference to the eighth possible implementation manner of the second aspect, in a ninth possible implementation manner of the second aspect, the user equipment further includes:

a third update unit, configured to: after the configuration unit configures the first supplementary service to the supplementary service the same as the second supplementary service in the second mapping relationship, update the second mapping relationship to a third mapping relationship, where the third mapping relationship is a mapping relationship among the first IMSI, the first GRUU, and the first supplementary service.

With reference to the eighth or the ninth possible implementation manner of the second aspect, in a tenth possible implementation manner of the second aspect, the user equipment further includes:

a sending unit, configured to: if the user equipment further saves a first mapping relationship, and the first mapping relationship is a mapping relationship among a second IMSI, the first GRUU, and the first supplementary service, when the user equipment performs registration by using the second IMSI and obtains the second GRUU, send a second deletion instruction to the server, to instruct the server to delete the second supplementary service currently saved in the server, where the configuration unit is further configured to configure, by using the server, the second supplementary service to a supplementary service the same as the first supplementary service in the first mapping relationship; and a fourth update unit, configured to update the first mapping relationship to a fourth mapping relationship, where the fourth mapping relationship is a mapping relationship among the second IMSI, the second GRUU, and the second supplementary service.

With reference to the eighth or the ninth possible implementation manner of the second aspect, in an eleventh possible implementation manner of the second aspect, the user equipment further includes:

a sending unit, configured to: if the user equipment further saves a first mapping relationship, and the first mapping relationship is a mapping relationship among a second IMSI, the first GRUU, and the first supplementary service, when the user equipment performs registration by using the second IMSI and obtains the second GRUU, send a second deletion instruction to the server, to instruct the server to delete the second supplementary service currently saved in the server, where the configuration unit is further configured to configure, by using the server, the second supplementary service to a supplementary service the same as the first supplementary service in the first mapping relationship; and a fourth update unit, configured to update the first mapping relationship to a fourth mapping relationship, where the fourth mapping relationship is a mapping relationship among the second IMSI, the second GRUU, and the second supplementary service.

With reference to the second aspect, in a twelfth possible implementation manner of the second aspect, the user equipment further includes:

a third storage unit, configured to: if the user equipment does not save a mapping relationship between the first IMSI and any GRUU, and the GRUU includes the first GRUU and the second GRUU, when the user equipment configures the first supplementary service corresponding to the first IMSI, save a third mapping relationship, where the third mapping relationship is a mapping relationship among the first IMSI, the first GRUU, and the first supplementary service.

According to a third aspect, user equipment is provided, including:

a receiver, configured to: after the user equipment registers with an Internet Protocol IP multimedia subsystem IMS network by using a first international mobile subscriber identity IMSI corresponding to a first telephone card, receive a first globally routable user agent uniform resource identifier GRUU sent by a server in the IMS network; and a processor, configured to: after the receiver receives the first GRUU, if the user equipment saves a mapping relationship between the first IMSI and a second GRUU, and the second GRUU and the first GRUU have a same Internet Protocol IP multimedia public identity IMPU, configure a first supplementary service to a supplementary service the same as a second supplementary service, where the first supplementary service is a supplementary service corresponding to the first GRUU, and the second supplementary service is a supplementary service corresponding to the second GRUU.

With reference to the third aspect, in a first possible implementation manner of the third aspect, the processor is specifically configured to:

query the server for the second supplementary service and save the second supplementary service;

send a first deletion instruction to the server, to instruct the server to delete the first supplementary service currently saved in the server;

configure, by using the server according to the saved second supplementary service, the first supplementary service to the supplementary service the same as the second supplementary service; and delete the saved second supplementary service.

With reference to the third aspect or the first possible implementation manner of the third aspect, in a second possible implementation manner of the third aspect, the processor is further configured to:

before configuring the first supplementary service to the supplementary service the same as the second supplementary service, if the user equipment further saves a mapping relationship between a second IMSI corresponding to a second telephone card and the first GRUU, query the server for the first supplementary service; and save a first mapping relationship, where the first mapping relationship is a mapping relationship among the second IMSI, the first GRUU, and the first supplementary service.

With reference to the second possible implementation manner of the third aspect, in a third possible implementation manner of the third aspect, the user equipment further includes:

a transmitter, configured to: after the processor configures the first supplementary service to the supplementary service the same as the second supplementary service, if the user equipment registers with the IMS network by using the second IMSI and obtains the second GRUU, send a second deletion instruction to the server, to instruct the server to delete the second supplementary service currently saved in the server, where the processor is further configured to configure, by using the server, the second supplementary service to a supplementary service the same as the first supplementary service in the first mapping relationship.

With reference to the third possible implementation manner of the third aspect, in a fourth possible implementation manner of the third aspect, the processor is further configured to:

after configuring the second supplementary service to the supplementary service the same as the first supplementary service in the first mapping relationship, delete the first supplementary service in the first mapping relationship; and update the mapping relationship between the second IMSI and the first GRUU to a mapping relationship between the second IMSI and the second GRUU.

With reference to the first or the second possible implementation manner of the third aspect, in a fifth possible implementation manner of the third aspect, the user equipment further includes:

a transmitter, configured to: after the processor queries the server for the second supplementary service and saves the second supplementary service, send a second deletion instruction to the server, to instruct the server to delete the second supplementary service.

With reference to any one of the third aspect to the fifth possible implementation manner of the third aspect, in a sixth possible implementation manner of the third aspect, the processor is further configured to:

update the mapping relationship between the first IMSI and the second GRUU to a mapping relationship between the first IMSI and the first GRUU.

With reference to the third aspect, in a seventh possible implementation manner of the third aspect, the processor is further configured to: after the receiver receives the first GRUU, if the user equipment does not save a mapping relationship between the first IMSI and any GRUU, and the GRUU includes the first GRUU and the second GRUU, save a mapping relationship between the first IMSI and the first GRUU.

With reference to the third aspect, in an eighth possible implementation manner of the third aspect, the processor is specifically configured to:

if the user equipment saves a second mapping relationship, and the second mapping relationship is a mapping relationship among the first IMSI, the second GRUU, and the second supplementary service, send a first deletion instruction to the server, to instruct the server to delete the first supplementary service currently saved in the server; and configure, by using the server, the first supplementary service to the supplementary service the same as the second supplementary service in the second mapping relationship.

With reference to the eighth possible implementation manner of the third aspect, in a ninth possible implementation manner of the third aspect, the processor is further configured to:

after configuring the first supplementary service to the supplementary service the same as the second supplementary service in the second mapping relationship, update the second mapping relationship to a third mapping relationship, where the third mapping relationship is a mapping relationship among the first IMSI, the first GRUU, and the first supplementary service.

With reference to the eighth or the ninth possible implementation manner of the third aspect, in a tenth possible implementation manner of the third aspect, the user equipment further includes:

a transmitter, configured to: if the user equipment further saves a first mapping relationship, and the first mapping relationship is a mapping relationship among a second IMSI, the first GRUU, and the first supplementary service, when the user equipment performs registration by using the second IMSI and obtains the second GRUU, send a second deletion instruction to the server, to instruct the server to delete the second supplementary service currently saved in the server, where the processor is further configured to configure, by using the server, the second supplementary service to a supplementary service the same as the first supplementary service in the first mapping relationship; and update the first mapping relationship to a fourth mapping relationship, where the fourth mapping relationship is a mapping relationship among the second IMSI, the second GRUU, and the second supplementary service.

With reference to the eighth or the ninth possible implementation manner of the third aspect, in an eleventh possible implementation manner of the third aspect, the user equipment further includes:

a transmitter, configured to send a second deletion instruction to the server, to instruct the server to delete the second supplementary service currently saved in the server.

With reference to the third aspect, in a twelfth possible implementation manner of the third aspect, the processor is further configured to:

if the user equipment does not save a mapping relationship between the first IMSI and any GRUU, and the GRUU includes the first GRUU and the second GRUU, when the user equipment configures the first supplementary service corresponding to the first IMSI, save a third mapping relationship, where the third mapping relationship is a mapping relationship among the first IMSI, the first GRUU, and the first supplementary service.

In the service processing method, and the user equipment that are provided in the embodiments of the present disclosure, after the user equipment registers with an IMS network and obtains a first GRUU, if the user equipment saves a mapping relationship between a first IMSI and a second GRUU, it indicates that a first telephone card is already registered and the second GRUU is obtained, that is, a GRUU corresponding to the first telephone card changes from the second GRUU to the first GRUU. In this case, a supplementary service that corresponds to the second GRUU and that is saved in a server in the IMS network is a supplementary service that is previously configured by a user and that is of the first telephone card, but a supplementary service that corresponds to the first GRUU and that is saved in the server is not the supplementary service of the first telephone card. Therefore, if the second GRUU and the first GRUU have a same IMPU, the user equipment may configure the supplementary service corresponding to the first GRUU to a supplementary service the same as the supplementary service corresponding to the second GRUU. Therefore, when an IMPU does not change but an GRUU changes, the first telephone card that is registered and for which the first GRUU is obtained corresponds to the supplementary service that is previously configured by the user and that is of the first telephone card, thereby resolving a problem in the prior art that because when an IMPU does not change, a card slot into which a telephone card is inserted changes, and a corresponding GRUU changes, a supplementary service that corresponds to the changed GRUU and that is saved in a server does not correspond to the telephone card, a supplementary service error of the telephone card is caused.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
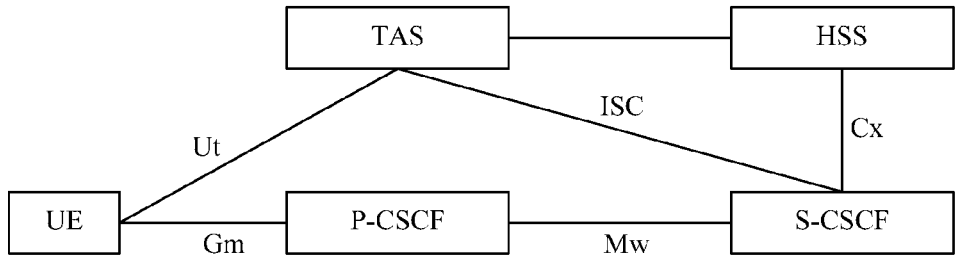
FIG. 1 is a diagram of a basic architecture of an IMS network according to an embodiment of the present disclosure.

A voice over Long Term Evolution (LTE) (VoLTE) based on an IMS network is a most ideal solution to a voice service of a $4^{th}$ generation mobile communications system (4G). For a basic architecture of the IMS network, refer to FIG. 1. In the IMS network architecture, a serving call session control function (S-CSCF) server may be configured to: maintain registration information of a user, and execute a session control service for a terminal (or User Equipment, UE). An application server (AS) may execute a specific service, for example, a telephony application server (TAS) may execute supplementary services such as call hold, call transfer, or call barring for the user. The terminal may communicate with a proxy call session control function (P-CSCF) server by using a Session Initiation Protocol (SIP) message, to perform IMS operations such as registration and session control. The terminal may communicate with the AS by using a Hyper Text Transfer Protocol (HTTP) message, and a Ut interface between the terminal and the AS may be used to configure a service, for example, the UE configures a supplementary service of a telephone card by using the Ut interface. A home subscriber server (HSS) is an important composition part of a control layer on the IMS, and may support a main user database that is used to process invoking/session and that is of an IMS network. In addition, the IMS network architecture may further include some interfaces between the terminal and the server in the IMS network and between servers.

The terminal in this application may be an intelligent communications module in the IMS network, and generally is a telephone card, for example, may be a subscriber identity module (SIM) card, a universal integrated circuit card (UICC card), or a universal subscriber identity module (USIM) card. The user equipment in this application may be user equipment into which a telephone card may be inserted for communication, for example, may be a mobile phone having at least two card slots, a personal communication service (PCS) phone, a Session Initiation Protocol phone, a personal digital assistant (PDA), or another portable, pocket-sized, handheld, and in-vehicle mobile device. Using the mobile phone as an example, a development trend of future mobile phones is: dual card, dual 4G, multi card, and full frequency. Therefore, when a user inserts a telephone card into any card slot, the user may normally use various services of the mobile phone.

When the user equipment registers with the IMS network by using any telephone card, the user equipment obtains a GRUU corresponding to the telephone card. This application is described by using an example in which a server allocating a GRUU to a telephone card in the user equipment and saving and executing a supplementary service is a telephony application server TAS in the IMS network. The GRUU obtained through registration includes an IMPU and an IMEI. The IMPU is a uniform resource identifier (URI), and may be a number, a text, or an identifier including a number. The IMEI includes a 15-digit number, and each digit of the number may be any number from zero to nine.

During registration, the user equipment may add a +sip.instance header to a registration request sent to the TAS, where the +sip.instance header usually includes an IMEI of the terminal. For example, the IMPU may be represented as: sip:userAihome.net, the IMEI may be represented as: 651725741582348 (a 15-digit decimal number), and a GRUU includes the IMPU and the IMEI, and may be: sip:userAihome.net; gr=urn:uuid: 651725741582348. When the user performs supplementary service configuration such call transfer and call barring, the user may configure a supplementary service corresponding to the GRUU. Specifically, the user equipment may send a supplementary service configuration request to the TAS in the IMS network, where the supplementary service configuration request carries the GRUU and a specific supplementary service needing to be configured, for example, barring the GRUU from initiating a call. After receiving the supplementary service configuration request, the TAS saves the supplementary service corresponding to the GRUU, and returns a configuration acknowledgement response to the user equipment to notify the user equipment that supplementary service configuration is completed.

When a same telephone card corresponds to different IMPUs, supplementary services corresponding to the telephone card may be different. For example, if the IMPU is Home, the supplementary service corresponding to the telephone card may be call-in barring, and if the IMPU is Company, the supplementary service corresponding to the telephone card may be call-out barring. Therefore, when the IMPU changes, the supplementary service corresponding to the telephone card may change. Therefore, when the GRUU changes due to a change of the IMPU corresponding to the telephone card, a supplementary service corresponding to the changed GRUU may not correspond to the telephone card. However, when the IMPU does not change, and the GRUU corresponding to the telephone card changes, a supplementary service corresponding to the changed GRUU needs to correspond to the telephone card, to ensure that no error is caused to the supplementary service.

In the embodiments of the present disclosure, a case in which a GRUU corresponding to a telephone card changes when an IMPU does not change is described.

Figure 2:
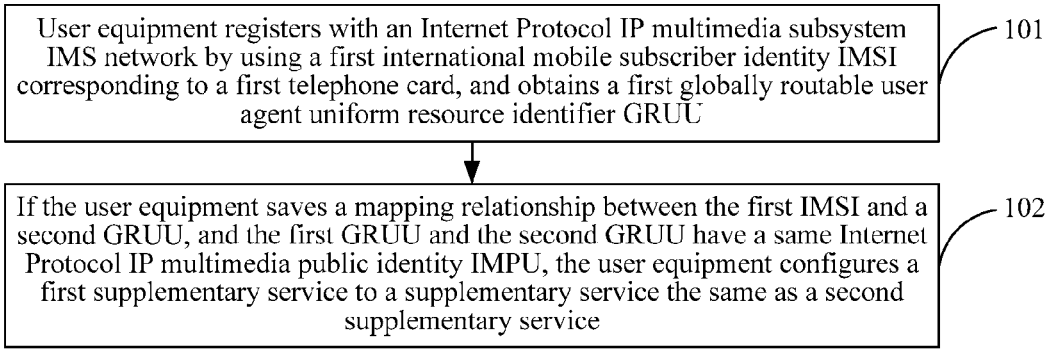
FIG. 2 is a flowchart of a service processing method according to an embodiment of the present disclosure.

Referring to FIG. 2, an embodiment of the present disclosure provides a service processing method. Main steps may include:

101: User equipment registers with an Internet Protocol IP multimedia subsystem IMS network by using a first international mobile subscriber identity IMSI corresponding to a first telephone card, and obtains a first globally routable user agent uniform resource identifier GRUU.

In this step, when the first telephone card is inserted into the user equipment, the user equipment may read an identity, that is, the first IMSI, of the first telephone card from the first telephone card, reads an IMEI that is saved in the user equipment and that corresponds to a card slot into which the first telephone card is inserted, and obtains an IMPU currently corresponding to the first telephone card. Then, the user equipment may send a registration request to a P-CSCF server, an S-CSCF server, a TAS server, or the like in the IMS network by using the first telephone card, to request to obtain the first GRUU allocated by the TAS in the IMS network. The first GRUU obtained through registration includes the IMPU corresponding to the first telephone card and the IMEI corresponding to the card slot into which the first telephone card is inserted.

102: If the user equipment saves a mapping relationship between the first IMSI and a second GRUU, and the first GRUU and the second GRUU have a same Internet Protocol IP multimedia public identity IMPU, the user equipment configures a first supplementary service to a supplementary service the same as a second supplementary service.

The first supplementary service is a supplementary service corresponding to the first GRUU, and the second supplementary service is a supplementary service corresponding to the second GRUU.

After the user equipment performs registration by using the first telephone card and obtains the first GRUU, if the user equipment saves the mapping relationship between the first IMSI corresponding to the first telephone card and the second GRUU, it indicates that before the first telephone card is currently inserted into the user equipment, the first telephone card is already registered and the second GRUU is obtained, that is, a GRUU corresponding to the first telephone card changes from the second GRUU to the first GRUU. Therefore, after the first GRUU is obtained through current registration, a supplementary service that corresponds to the second GRUU and that is saved in the TAS in the IMS network is a supplementary service that is configured when the first telephone card is previously inserted into the user equipment, and a supplementary service that corresponds to the first GRUU and that is saved in the TAS is a supplementary service that is previously configured by the user and that is of another telephone card, and is not a supplementary service corresponding to the first telephone card. Therefore, if the first GRUU and the second GRUU have a same IMPU, the user equipment may configure the first supplementary service to the supplementary service the same as the second supplementary service, that is, configure the supplementary service corresponding to the first GRUU to the supplementary service the same as the supplementary service corresponding to the second GRUU. In this way, when an IMPU does not change but a GRUU changes, the first telephone card that is registered and for which the first GRUU is obtained can correspond to the supplementary service that is previously configured by the user, to ensure that no error is caused to the supplementary service of the first telephone card.

Specifically, the configuring, by the user equipment, a first supplementary service to a supplementary service the same as a second supplementary service may include: if the user previously configures the supplementary service corresponding to the second GRUU corresponding to the first telephone card, sending, by the user equipment, a supplementary service configuration request to the TAS, to configure the first supplementary service to the supplementary service the same as the second supplementary service saved in the TAS, so that the first telephone card corresponds to the previously configured supplementary service of the first telephone card, thereby ensuring that no error is caused to the supplementary service of the first telephone card; or if the user previously does not configure the supplementary service corresponding to the second GRUU corresponding to the first telephone card, that is, the supplementary service that corresponds to the second GRUU and that is saved in the TAS is null, the user equipment may instruct the TAS to delete the supplementary service that corresponds to the first GRUU and that is saved in the TAS, thereby ensuring that no error is caused to the supplementary service of the first telephone card.

It should be noted that if the first GRUU and the second GRUU have different IMPUs, telephone cards corresponding to different IMPUs may correspond to different supplementary services. Therefore, the first supplementary service does not need to be configured to the supplementary service the same as the second supplementary service.

In the service processing method provided in this embodiment of the present disclosure, after the user equipment registers with an IMS network and obtains a first GRUU, if the user equipment saves a mapping relationship between a first IMSI and a second GRUU, it indicates that a first telephone card is already registered and the second GRUU is obtained, that is, a GRUU corresponding to the first telephone card changes from the second GRUU to the first GRUU. In this case, a supplementary service that corresponds to the second GRUU and that is saved in a server in the IMS network is a supplementary service that is previously configured by a user and that is of the first telephone card, but a supplementary service that corresponds to the first GRUU and that is saved in the server is not the supplementary service of the first telephone card. Therefore, if the second GRUU and the first GRUU have a same IMPU, the user equipment may configure the supplementary service corresponding to the first GRUU to a supplementary service the same as the supplementary service corresponding to the second GRUU. Therefore, when an IMPU does not change but an GRUU changes, the first telephone card that is registered and for which the first GRUU is obtained corresponds to the supplementary service that is previously configured by the user and that is of the first telephone card, thereby resolving a problem in the prior art that because when an IMPU does not change, a card slot into which a telephone card is inserted changes, and a corresponding GRUU changes, a supplementary service that corresponds to the changed GRUU and that is saved in a server does not correspond to the telephone card, a supplementary service error of the telephone card is caused.

Another embodiment of the present disclosure describes a service processing method by using an example in which user equipment is a dual card mobile phone, and only one telephone card is inserted into the mobile phone.

Figure 3:
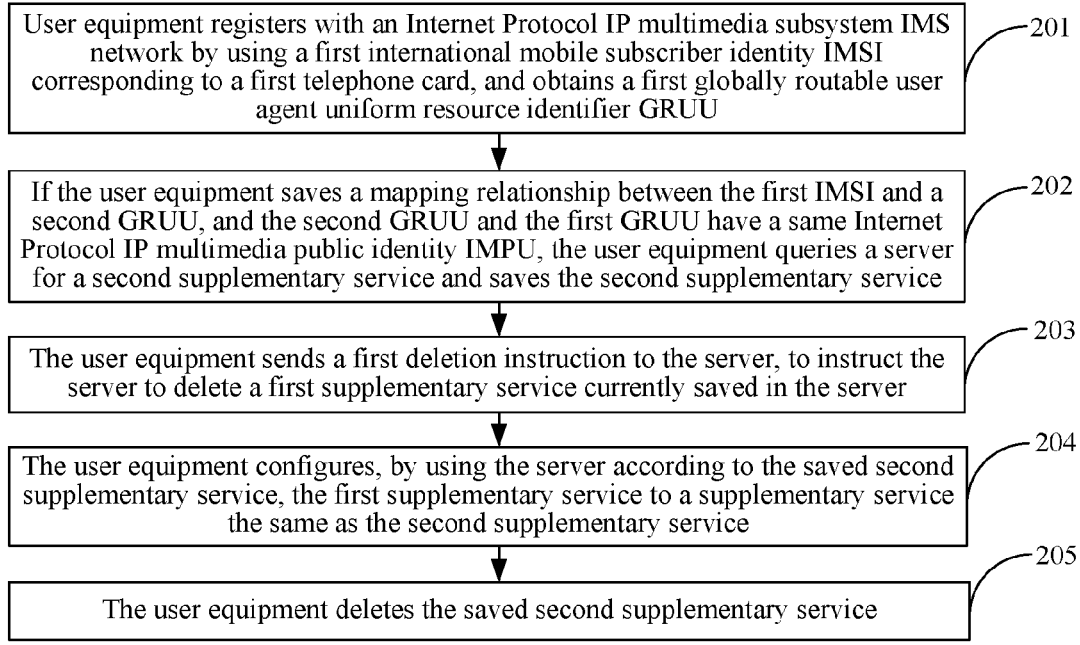
FIG. 3 is a flowchart of another service processing method according to an embodiment of the present disclosure.

For example, if a first telephone card is previously inserted into card slot 2 of the mobile phone, the first telephone card is registered, a second GRUU is obtained, the second GRUU includes an IMPU and an IMEI-2, a second supplementary service S2 is configured, and the first telephone card is currently inserted into card slot 1 of the mobile phone, referring to FIG. 3, main steps of the method may include:

201: The user equipment registers with an Internet Protocol IP multimedia subsystem IMS network by using a first international mobile subscriber identity IMSI corresponding to a first telephone card, and obtains a first globally routable user agent uniform resource identifier GRUU.

If the first telephone card is inserted into card slot 1 (corresponding to an IMEI-1) of the mobile phone, and no telephone card is inserted into card slot 2 (corresponding to an IMEI-2) of the mobile phone, the mobile phone may register with the IMS network by using the first telephone card. For example, a registration process may include:

1. The mobile phone initiates a registration request to the IMS network by using the first telephone card, where the registration request passes through a P-CSCF and arrives at an S-CSCF, and the registration request carries an IMPU and the IMEI-1 that corresponds to card slot 1 into which the first telephone card is currently inserted.

2. The S-CSCF is used to replace the mobile phone and initiates registration to the TAS, where the registration message carries the IMPU corresponding to the first telephone card.

3. The TAS returns an acknowledgement message to the S-CSCF.

4. The S-CSCF returns the acknowledgement message to the mobile phone through the P-CSCF, where the acknowledgement message carries the first GRUU allocated to the mobile phone.

If the first GRUU obtained by the mobile phone after the mobile phone performs registration by using the first telephone card includes the IMPU and the IMEI-1, when the first GRUU is called in the IMS network, the first telephone card may be called uniquely.

After the first telephone card is currently inserted into card slot 1 and the first GRUU is obtained, the mobile phone saves at least a correspondence shown in Table 1-1, and the TAS saves at least a supplementary service shown in Table 2-1.

TABLE 1-1

| Mobile phone | First IMSI, second GRUU |
|---|---|

TABLE 2-1

| TAS | Second supplementary service (S2) |
|---|---|

As shown in Table 1, the mobile phone saves a mapping relationship between the first IMSI and the second GRUU.

202: If the user equipment saves a mapping relationship between the first IMSI and a second GRUU, and the second GRUU and the first GRUU have a same Internet Protocol IP multimedia public identity IMPU, the user equipment queries a server for a second supplementary service and saves the second supplementary service.

The second supplementary service is a supplementary service corresponding to the second GRUU. After the first GRUU is obtained in step 201, using Table 1 as an example, if the mobile phone saves the mapping relationship between the first IMSI and the second GRUU, it indicates that before the first telephone card is currently inserted into the mobile phone, the first telephone card is already registered and the second GRUU is obtained, that is, the GRUU corresponding to the first telephone card changes from the second GRUU to the first GRUU. Therefore, after current registration is performed and the first GRUU is obtained, a supplementary service (that is, the second supplementary service) that corresponds to the second GRUU and that is saved in the TAS in the IMS network is a supplementary service that is configured when the first telephone card is previously inserted into the mobile phone. However, a supplementary service (that is, a first supplementary service) that corresponds to the first GRUU and that is saved in the TAS is a supplementary service that is previously configured by the user and that is of another telephone card, and is not the supplementary service corresponding to the first telephone card. Therefore, when the second GRUU and the first GRUU have the same IMPU, the mobile phone may query the TAS for the second supplementary service, and after receiving a query response sent by the TAS, save the second supplementary service carried in the query response, that is, save the supplementary service that is set by the user before the current registration and that is of the first telephone card, so as to configure the first supplementary service to a supplementary service the same as the saved second supplementary service, so that when the IMPU does not change but the GRUU changes, the first telephone card corresponds to the previously configured supplementary service of the first telephone card, thereby ensuring that no error is caused to the supplementary service of the first telephone card.

After the second supplementary service is saved, the correspondence that is saved in the mobile phone and that is shown in Table 1-1 changes to a correspondence shown in Table 1-2.

TABLE 1-2

| Mobile phone | First IMSI, second GRUU |
| --- | --- |
| | Second supplementary service (S2) |

It should be noted that in this step if the mobile phone does not obtain through querying the second supplementary service when querying the TAS for the second supplementary service, that is, the TAS does not save the second supplementary service, it indicates that a supplementary service is not configured for the first telephone card when the first telephone card is previously inserted into the mobile phone. In this case, after the first telephone card is currently inserted into the mobile phone, the first supplementary service is configured to null, to configure the first supplementary service to the supplementary service the same as the second supplementary service, so that no error is caused to the supplementary service of the first telephone card.

Further, after the mobile phone queries the TAS for the second supplementary service and saves the second supplementary service, the method may further include: sending, by the mobile phone, a second deletion instruction to the TAS, to instruct the TAS to delete the second supplementary service currently saved in the TAS.

Because the first GRUU is obtained after the first telephone card is registered, the TAS executes the supplementary service of the first telephone card according to the supplementary service corresponding to the first GRUU. Therefore, after the second supplementary service is saved, the mobile phone may send a second deletion instruction carrying the second GRUU to the TAS, to instruct the TAS to delete the second supplementary service currently saved in the TAS. In this way, when a second telephone card is inserted into card slot 2 of the mobile phone next time and the second GRUU is obtained, an impact of the current second supplementary service (the supplementary service of the first telephone card) on a supplementary service of the second telephone card may be avoided. In addition, after sending the second deletion instruction to the TAS, the mobile phone may further receive a configuration acknowledgement response sent by the TAS, to notify the mobile phone that the TAS already successfully deletes the second supplementary service.

203: The user equipment sends a first deletion instruction to the server, to instruct the server to delete a first supplementary service currently saved in the server.

When configuring the first supplementary service to the supplementary service the same as the second supplementary service, because the TAS does not automatically update the first supplementary service to the supplementary service the same as the second supplementary service, and the TAS can delete an old supplementary service only by receiving a deletion instruction sent by the mobile phone, and add a new supplementary service by receiving a configuration request sent by the mobile phone, in this step, before the first supplementary service is configured, the first supplementary service saved in the TAS needs to be deleted first. If the first supplementary service in the TAS is not deleted before the first supplementary service is configured, after the configuration, in addition to the old first supplementary service before the configuration, the TAS further saves the new first supplementary service the same as the second supplementary service, causing an error to the supplementary service. In addition, after sending the first deletion instruction to the TAS, the mobile phone may further receive a configuration acknowledgement response sent by the TAS, to notify the mobile phone that the TAS already successfully deletes the first supplementary service.

It should be noted that when the TAS receives the first deletion instruction that is sent by the user equipment and that is used to instruct the TAS to delete the first supplementary service, the TAS may not save the first supplementary service. In this case, the TAS does not perform a deletion operation, but still sends a configuration acknowledgment response to the mobile phone.

204: The user equipment configures, by using the server according to the saved second supplementary service, the first supplementary service to a supplementary service the same as the second supplementary service.

In this step, the mobile phone sends a supplementary service configuration request to the TAS according to the saved second supplementary service, to configure the first supplementary service to the supplementary service the same as the second supplementary service, so that after the first telephone card is currently inserted into the mobile phone, the first telephone card corresponds to the supplementary service that is previously configured by the user and that is of the first telephone card, thereby ensuring that no error is caused to the supplementary service.

After the first supplementary service is configured to the supplementary service the same as the second supplementary service, a correspondence saved in the TAS may be shown in Table 2-2.

TABLE 2-2

| TAS | First supplementary service (S1) |
| --- | --- |

205: The user equipment deletes the saved second supplementary service.

After the mobile phone configures, according to the saved second supplementary service, the first supplementary service to the supplementary service the same as the second supplementary service, the mobile phone may further delete the saved second supplementary service. After the second supplementary service is deleted, a correspondence saved in the mobile phone may be shown in Table 1-3.

TABLE 1-3

| Mobile phone | First IMSI, second GRUU |
| --- | --- |

In addition, the method in this embodiment of the present disclosure may include: updating, by the mobile phone, the mapping relationship between the first IMSI and the second GRUU to a mapping relationship between the first IMSI and the first GRUU.

Specifically, after the first telephone card is registered and the first GRUU is obtained, if the mobile phone saves the mapping relationship between the first IMSI and the second GRUU, the mobile phone may update the mapping relationship between the first IMSI and the second GRUU when the first telephone card is previously inserted into the mobile phone to the mapping relationship between the first IMSI and the first GRUU when the first telephone card is currently inserted into the mobile phone. After the mapping relationship between the first IMSI and the second GRUU is updated to the mapping relationship between the first IMSI and the first GRUU, a correspondence saved in the mobile phone may be shown in Table 1-4.

TABLE 1-4

| Mobile phone | First IMSI, first GRUU |
| --- | --- |

It should be noted that this embodiment of the present disclosure is described by using an example in which after the first GRUU is obtained, the mobile phone saves the mapping relationship between the first IMSI and the second GRUU. If the mobile phone does not save a mapping relationship between the first IMSI and any GRUU, and the GRUU includes the first GRUU and the second GRUU, the mobile phone saves the mapping relationship between the first IMSI and the first GRUU.

Specifically, after the first GRUU is obtained in step 201, if the mobile phone does not save the mapping relationship between the first IMSI and any GRUU, it indicates that the first telephone card has not been inserted into the mobile phone. In this case, the mobile phone may save the mapping relationship between the first IMSI and the GRUU for the first time, to update the mapping relationship between the first IMSI and the GRUU later.

In addition, after configuring the first supplementary service to the supplementary service the same as the second supplementary service, the mobile phone may further re-configure a new first supplementary service by using the TAS, to update the supplementary service of the first telephone card. Specifically, the mobile phone may instruct the TAS to delete the first supplementary service currently saved in the TAS, and send a supplementary service configuration request to the TAS by using the first telephone card and a Ut interface between the mobile phone and the TAS in the IMS network. For example, a supplementary service in the supplementary service configuration request may be: barring a call from the first GRUU, that is, barring a call from the first telephone card corresponding to the first GRUU in card slot 1. After receiving the supplementary service configuration request that is sent by the mobile phone by using the Ut interface, the TAS saves the supplementary service that corresponds to the first GRUU and that is in the supplementary service configuration request, and sends a configuration acknowledgement response to the mobile phone. The configuration acknowledgement response is used to notify the mobile phone that the supplementary service is configured completely.

Figure 4:
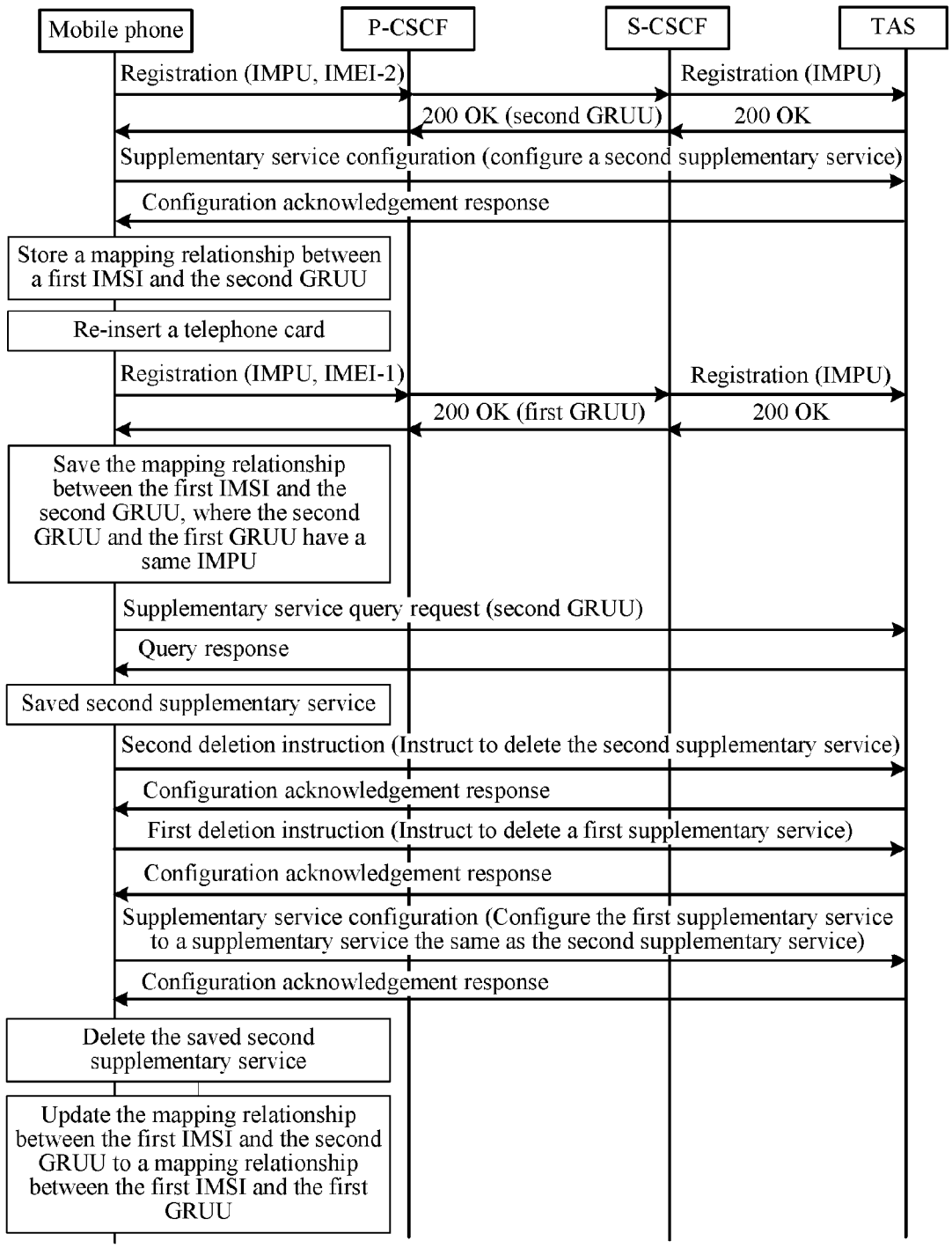
FIG. 4 is a flowchart of interaction between a mobile phone and a server in an IMS network according to an embodiment of the present disclosure.

In this embodiment of the present disclosure, after sending the first deletion instruction or the second deletion instruction to the TAS, the mobile phone may further receive the configuration acknowledgement response sent by the TAS. For a flowchart of interaction among the mobile phone, the P-CSCF in the IMS network, the S-CSCF in the IMS network, and the TAS, refer to FIG. 4.

It should be noted that, this embodiment of the present disclosure is described by using an example in which only the first telephone card is inserted into the mobile phone. Certainly, another telephone card may be inserted, and the telephone card is not limited to the first telephone card.

In addition, the user equipment in this embodiment of the present disclosure is described by using an example in which the user equipment is the dual card mobile phone. Certainly, the user equipment in this embodiment of the present disclosure may be a multi-card mobile phone, or another user equipment having at least two card slots. This is not limited in this embodiment of the present disclosure.

In the service processing method provided in this embodiment of the present disclosure, after user equipment registers with an IMS network and obtains a first GRUU, if the user equipment saves a mapping relationship between a first IMSI and a second GRUU, it indicates that a first telephone card is already registered and the second GRUU is obtained, that is, a GRUU corresponding to the first telephone card changes from the second GRUU to the first GRUU. In this case, a supplementary service that corresponds to the second GRUU and that is saved in a server in the IMS network is a supplementary service that is previously configured by a user and that is of the first telephone card, but a supplementary service that corresponds to the first GRUU and that is saved in the server is not the supplementary service of the first telephone card. Therefore, if the second GRUU and the first GRUU have a same IMPU, the user equipment may configure the supplementary service corresponding to the first GRUU to a supplementary service the same as the supplementary service corresponding to the second GRUU. Therefore, when an IMPU does not change but an GRUU changes, the first telephone card that is registered and for which the first GRUU is obtained corresponds to the supplementary service that is previously configured by the user and that is of the first telephone card, thereby resolving a problem in the prior art that because when an IMPU does not change, a card slot into which a telephone card is inserted changes, and a corresponding GRUU changes, a supplementary service that corresponds to the changed GRUU and that is saved in a server does not correspond to the telephone card, a supplementary service error of the telephone card is caused.

Still another embodiment of the present disclosure describes a service processing method by using an example in which user equipment is a dual card mobile phone and a first telephone card (corresponding to a first IMSI) and a second telephone card (corresponding to a second IMSI) are inserted into the dual card mobile phone.

For example, correspondences shown in Table 3 exist respectively when the first telephone card is previously inserted into the mobile phone and when the first telephone card is currently inserted into the mobile phone, and a second GRUU and a first GRUU have a same IMPU.

TABLE 3

| Moment | Telephone card | Card slot | GRUU | Supplementary service |
| --- | --- | --- | --- | --- |
| Previous | Second telephone card | Card slot 1 | First GRUU | First supplementary service (S1) |
|  | First telephone card | Card slot 2 | Second GRUU | Second supplementary service (S2) |
| Current | First telephone card | Card slot 1 |  |  |
|  | Second telephone card | Card slot 2 |  |  |

Figure 5:
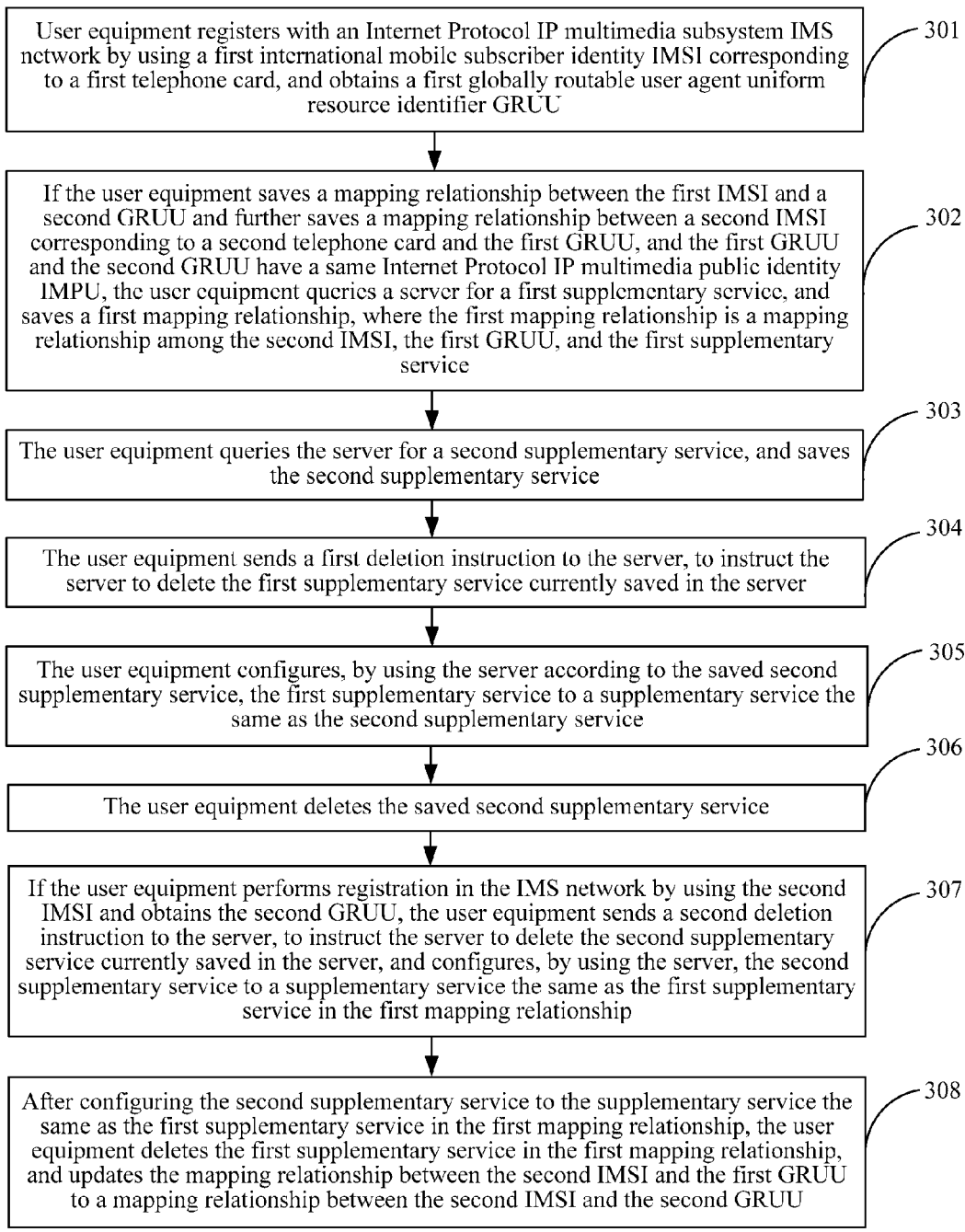
FIG. 5 is a flowchart of still another service processing method according to an embodiment of the present disclosure.

Referring to FIG. 5, the method described in this embodiment of the present disclosure may mainly include the following steps.

301: The user equipment registers with an Internet Protocol IP multimedia subsystem IMS network by using a first international mobile subscriber identity IMSI corresponding to a first telephone card, and obtains a first globally routable user agent uniform resource identifier GRUU.

For a specific process of obtaining the first GRUU in step 301, refer to descriptions of step 201. It should be noted that when the first telephone card and the second telephone card are inserted into the mobile phone at the same time, the mobile phone may also register with the IMS network by using the second IMSI and obtain the second GRUU.

After the first GRUU is obtained by using the first IMSI, the correspondence in Table 3 changes to the correspondence in Table 4.

TABLE 4

| Moment | Telephone card | Card slot | GRUU | Supplementary service |
|---|---|---|---|---|
| Previous | Second telephone card | Card slot 1 | First GRUU | First supplementary service (S1) |
|  | First telephone card | Card slot 2 | Second GRUU | Second supplementary service (S2) |
| Current | First telephone card | Card slot 1 | First GRUU |  |
|  | Second telephone card | Card slot 2 |  |  |

According to the correspondence shown in Table 4, after the first telephone card is registered and the first GRUU is obtained, the mobile phone saves at least correspondences shown in Table 5-1, and a TAS saves at least supplementary services shown in Table 6-1.

TABLE 5-1

| Mobile phone | First IMSI, second GRUU |
|---|---|
|  | Second IMSI, first GRUU |

TABLE 6-1

| TAS | First supplementary service (S1) |
|---|---|
|  | Second supplementary service (S2) |

As can be known from Table 5-1, the mobile phone saves a mapping relationship between the first IMSI and the second GRUU and a mapping relationship between the second IMSI and the first GRUU.

302: If the user equipment saves a mapping relationship between the first IMSI and a second GRUU and further saves a mapping relationship between a second IMSI corresponding to a second telephone card and the first GRUU, and the first GRUU and the second GRUU have a same Internet Protocol IP multimedia public identity IMPU, the user equipment queries a server for a first supplementary service, and saves a first mapping relationship, where the first mapping relationship is a mapping relationship among the second IMSI, the first GRUU, and the first supplementary service.

If the mobile phone saves the mapping relationship between the first IMSI and the second GRUU, it indicates that before the first telephone card is currently inserted into the mobile phone, the first telephone card is already registered and the second GRUU is obtained, that is, the GRUU corresponding to the first telephone card changes from the second GRUU to the first GRUU. Therefore, after current registration is performed and the first GRUU is obtained, a supplementary service (that is, the second supplementary service) that corresponds to the second GRUU and that is saved in the TAS in the IMS network is a supplementary service that is configured when the first telephone card is previously inserted into the mobile phone. However, the supplementary service that corresponds to the first GRUU and that is saved in the TAS is a supplementary service that is previously configured by the user and that is of another telephone card, and is not the supplementary service corresponding to the first telephone card. Therefore, if the first GRUU and the second GRUU have a same IMPU, the mobile phone may query the TAS for the second supplementary service and save the second supplementary service, to save a supplementary service that is set by the user before current registration and that is of the first telephone card, so as to configure, when the IMPU does not change and according to the saved second supplementary service, the first supplementary service to a supplementary service the same as the second supplementary service.

Similarly, if the mobile phone further saves the mapping relationship between the second IMSI corresponding to the second telephone card and the first GRUU, it indicates that before the second telephone card is currently inserted into the mobile phone, the second telephone card is registered and the first GRUU is obtained, that is, the GRUU corresponding to the second telephone card changes from the first GRUU to the second GRUU. Therefore, if the first GRUU and the second GRUU have a same IMPU, the second supplementary service needs to be configured to the supplementary service that is previously configured by the user and that is of the second telephone card, that is, the supplementary service the same as the first supplementary service, so that when the IMPU does not change, the second telephone card corresponds to the supplementary service of the second telephone card, thereby ensuring that no error is caused to the supplementary service of the second telephone card.

Therefore, the mobile phone may query the TAS for the first supplementary service, and saves a mapping relationship among the second IMSI, the first GRUU, and the first supplementary service, to save the supplementary service previously configured for the first telephone card, that is, the first supplementary service, into the mobile phone, so that the second supplementary service may be configured, later according to the first supplementary service saved in the mobile phone, to the supplementary service the same as the first supplementary service.

In this case, the correspondence that is saved in the mobile phone and that is shown in Table 5-1 changes to the correspondence shown in Table 5-2.

TABLE 5-2

| Mobile phone | First IMSI, second GRUU |
|---|---|
|  | Second IMSI, first GRUU, and first supplementary service (first mapping relationship) |

303: The user equipment queries the server for a second supplementary service, and saves the second supplementary service.

After saving the first mapping relationship, the mobile phone may query the TAS for the second supplementary service and save the second supplementary service, so as to configure, according to the second supplementary service saved in the mobile phone, the first supplementary service to a supplementary service the same as the second supplementary service.

In this case, the correspondence shown in the mobile phone may be shown in Table 5-3.

TABLE 5-3

| Mobile phone | First IMSI, second GRUU |
| --- | --- |
| | Second IMSI, first GRUU, and first supplementary service (first mapping relationship) |
| | Second supplementary service (S2) |

304: The user equipment sends a first deletion instruction to the server, to instruct the server to delete the first supplementary service currently saved in the server.

After the mobile phone sends the deletion instruction to the TAS to instruct the TAS to delete the first supplementary service, the supplementary service saved in the TAS may be shown in Table 6-2.

TABLE 6-2

| TAS | Second supplementary service (S2) |
| --- | --- |

305: The user equipment configures, by using the server according to the saved second supplementary service, the first supplementary service to a supplementary service the same as the second supplementary service.

After the mobile phone sends a supplementary service configuration request to the TAS to configure the first supplementary service to the supplementary service the same as the second supplementary service, the supplementary service saved in the TAS may be shown in Table 6-3.

TABLE 6-3

| TAS | First supplementary service (S2) |
| --- | --- |
| | Second supplementary service (S2) |

306: The user equipment deletes the saved second supplementary service.

After the mobile phone deletes the second supplementary service, the correspondence saved in the mobile phone may be shown in Table 5-4.

TABLE 5-4

| Mobile phone | First IMSI, second GRUU |
| --- | --- |
| | Second IMSI, first GRUU, and first supplementary service (first mapping relationship) |

For specific descriptions of step 303 to step 306, refer to step 202 to step 205, and details are not described herein again.

307: If the user equipment registers with the IMS network by using the second IMSI and obtains the second GRUU, the user equipment sends a second deletion instruction to the server, to instruct the server to delete the second supplementary service currently saved in the server, and configures, by using the server, the second supplementary service to a supplementary service the same as the first supplementary service in the first mapping relationship.

Because the first telephone card and the second telephone card are currently inserted into the mobile phone at the same time, the mobile phone may perform registration by using the second IMSI and obtain the second GRUU. In this case, the mobile phone may send the second deletion instruction to the TAS, to instruct the TAS to delete the second supplementary service. After instructing the TAS to delete the second supplementary service, the mobile phone may send a supplementary service configuration request to the TAS, to configure the second supplementary service to the new supplementary service the same as the first supplementary service in the first mapping relationship saved in step 302, so that the second telephone card corresponds to the previously configured supplementary service of the second telephone card, thereby ensuring that no error is caused to the supplementary service of the second telephone card.

After the second supplementary service currently saved in the TAS is deleted, the supplementary service saved in the TAS may be shown in Table 6-4.

TABLE 6-4

| TAS | First supplementary service (S2) |
| --- | --- |

After the second supplementary service is configured, by using the TAS, to the supplementary service the same as the first supplementary service in the first mapping relationship, the supplementary service saved in the TAS may be shown in Table 6-5.

TABLE 6-5

| TAS | First supplementary service (S2) |
| --- | --- |
| | Second supplementary service (S1) |

308: After configuring the second supplementary service to the supplementary service the same as the first supplementary service in the first mapping relationship, the user equipment deletes the first supplementary service in the first mapping relationship, and updates the mapping relationship between the second IMSI and the first GRUU to a mapping relationship between the second IMSI and the second GRUU.

After the first supplementary service in the first mapping relationship is deleted, the correspondence saved in the mobile phone may be shown in Table 5-5.

TABLE 5-5

| Mobile phone | First IMSI, second GRUU |
| --- | --- |
| | Second IMSI, first GRUU |

After the mapping relationship between the second IMSI and the first GRUU is updated to the mapping relationship between the second IMSI and the second GRUU in this step, the correspondence saved in the mobile phone may be shown in Table 5-6.

TABLE 5-6

| Mobile phone | First IMSI, second GRUU |
| --- | --- |
| | Second IMSI, second GRUU |

In addition, the method in this embodiment of the present disclosure may include: updating, by the mobile phone, the mapping relationship between the first IMSI and the second GRUU to a mapping relationship between the first IMSI and the first GRUU.

After the mapping relationship is updated, the correspondence saved in the mobile phone may be shown in Table 5-7.

TABLE 5-7

| Mobile phone | First IMSI, first GRUU |
|---|---|
| | Second IMSI, second GRUU |

It should be noted that this embodiment of the present disclosure is described by using an example in which the first telephone card is previously inserted into the mobile phone. If the first telephone card is not inserted into the mobile phone previously, that is, after the first GRUU is obtained, if the mobile phone does not save a mapping relationship between the first IMSI and any GRUU, and the GRUU includes the first GRUU and the second GRUU, the mobile phone may save the mapping relationship between the first IMSI and the first GRUU, to save the mapping relationship between the first IMSI and the GRUU for the first time, so as to update the mapping relationship between the first IMSI and the GRUU later.

Similarly, if the second telephone card is registered and the second GRUU is obtained, if the mobile phone does not save a mapping relationship between the second IMSI and any GRUU, and the GRUU includes the first GRUU and the second GRUU, that is, the second telephone card is not inserted into the mobile phone previously, the mobile phone may save the mapping relationship between the second IMSI and the second GRUU, to save the mapping relationship between the second IMSI and the GRUU for the first time, so as to update the mapping relationship between the second IMSI and the GRUU later.

In addition, this embodiment of the present disclosure is described by using an example in which the first telephone card and the second telephone card are inserted into the mobile phone. Other telephone cards such as the first telephone card and a third telephone card may be inserted into the mobile phone. This is not limited in this embodiment of the present disclosure.

In addition, the user equipment in this embodiment of the present disclosure is described by using an example in which the user equipment is the dual card mobile phone. Certainly, the user equipment in this embodiment of the present disclosure may be a multi-card mobile phone, or another user equipment having at least two card slots. This is not limited in this embodiment of the present disclosure.

In the service processing method provided in this embodiment of the present disclosure, after user equipment registers with an IMS network and obtains a first GRUU, if the user equipment saves a mapping relationship between a first IMSI and a second GRUU, it indicates that a first telephone card is already registered and the second GRUU is obtained, that is, a GRUU corresponding to the first telephone card changes from the second GRUU to the first GRUU. In this case, a supplementary service that corresponds to the second GRUU and that is saved in a server in the IMS network is a supplementary service that is previously configured by a user and that is of the first telephone card, but a supplementary service that corresponds to the first GRUU and that is saved in the server is not the supplementary service of the first telephone card. Therefore, if the second GRUU and the first GRUU have a same IMPU, the user equipment may configure the supplementary service corresponding to the first GRUU to a supplementary service the same as the supplementary service corresponding to the second GRUU. Therefore, when an IMPU does not change but an GRUU changes, the first telephone card that is registered and for which the first GRUU is obtained corresponds to the supplementary service that is previously configured by the user and that is of the first telephone card, thereby resolving a problem in the prior art that because when an IMPU does not change, a card slot into which a telephone card is inserted changes, and a corresponding GRUU changes, a supplementary service that corresponds to the changed GRUU and that is saved in a server does not correspond to the telephone card, a supplementary service error of the telephone card is caused.

Another embodiment of the present disclosure describes a service processing method by using an example in which user equipment is a dual card mobile phone, and only a first telephone card is inserted into the mobile phone.

Figure 6:
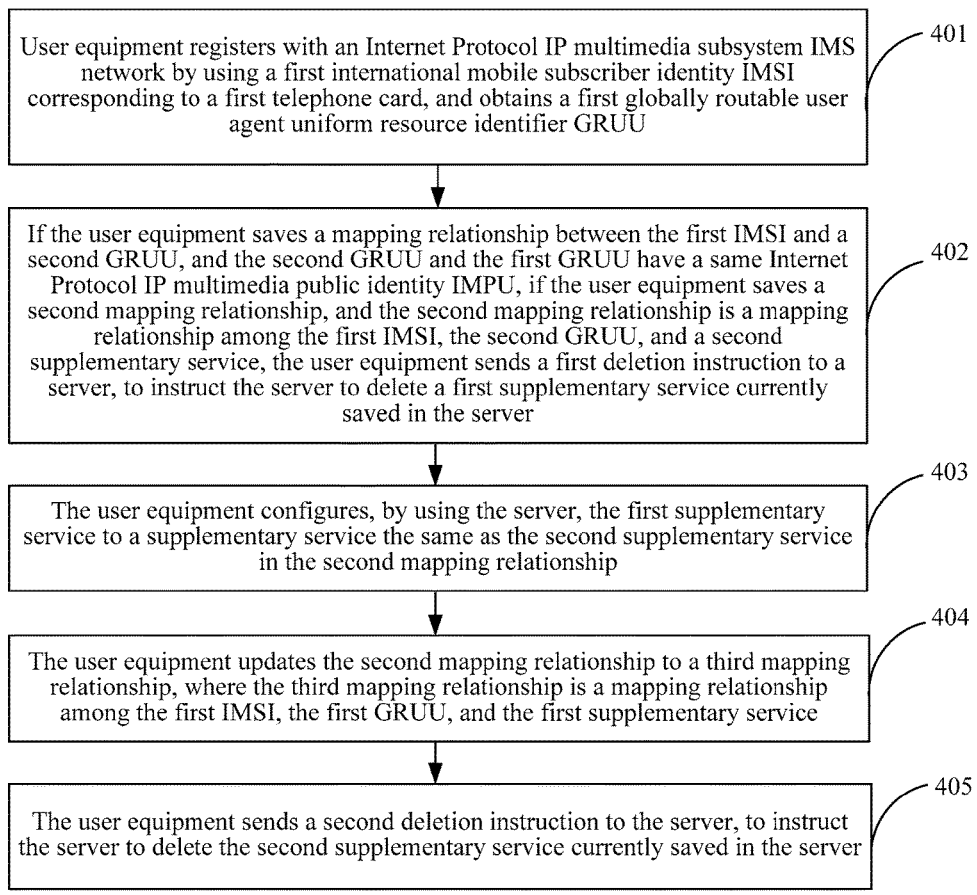
FIG. 6 is a flowchart of another service processing method according to an embodiment of the present disclosure.

For example, if the first telephone card is previously inserted into card slot 2 of the mobile phone, the first telephone card is registered, the second GRUU is obtained, the second GRUU includes an IMPU and an IMEI-2, a second supplementary service S2 is configured, and the first telephone card is currently inserted into card slot 1 (corresponding to an IMEI-1) of the mobile phone, referring to FIG. 6, main steps of the method may include:

401: The user equipment registers with an Internet Protocol IP multimedia subsystem IMS network by using a first international mobile subscriber identity IMSI corresponding to a first telephone card, and obtains a first globally routable user agent uniform resource identifier GRUU.

For a specific process in which the mobile phone performs registration by using the first telephone card and obtains the first GRUU, refer to descriptions of step 201. For example, the first GRUU obtained through registration includes an IMPU and the IMEI-1.

After the first GRUU is obtained by using the first IMSI, the mobile phone saves at least the correspondence shown in Table 7-1.

TABLE 7-1

| Mobile phone | First IMSI, second GRUU, and supplementary service (S2) corresponding to the second GRUU |
|---|---|

TABLE 8-1

| TAS | Second supplementary service (S2) |
|---|---|

402: If the user equipment saves a mapping relationship between the first IMSI and a second GRUU, and the second GRUU and the first GRUU have a same Internet Protocol IP multimedia public identity IMPU, if the user equipment saves a second mapping relationship, and the second mapping relationship is a mapping relationship among the first IMSI, the second GRUU, and a second supplementary service, the user equipment sends a first deletion instruction to a server, to instruct the server to delete a first supplementary service currently saved in the server.

The first supplementary service is a supplementary service corresponding to the first GRUU, and the second supplementary service is a supplementary service corresponding to the second GRUU.

If the mobile phone saves the mapping relationship between the first IMSI and the second GRUU, it indicates that before the first telephone card is currently inserted into the user equipment, the first telephone card is already registered and the second GRUU is obtained, that is, the GRUU corresponding to the first telephone card changes from the second GRUU to the first GRUU. Therefore, after current registration is performed and the first GRUU is obtained, a supplementary service (that is, the second supplementary service) that corresponds to the second GRUU and that is saved in the TAS in the IMS network is a supplementary service that is configured when the first telephone card is previously inserted into the mobile phone. However, a supplementary service (that is, the first supplementary service) that corresponds to the first GRUU and that is saved in the TAS is a supplementary service that is previously configured by the user and that is of another telephone card, and is not the supplementary service corresponding to the first telephone card. In this case, if the second GRUU and the first GRUU have a same IMPU, and the mobile phone saves the mapping relationship among the first IMSI, the second GRUU, and the second supplementary service, that is, the second mapping relationship, the mobile phone may configure, according to the second supplementary service in the second mapping relationship, the first supplementary service to a supplementary service the same as the second supplementary service, so that when the IMPU does not change but the GRUU changes, the first telephone card corresponds to the previously configured supplementary service of the first telephone card, thereby ensuring that no error is caused to the supplementary service of the first telephone card.

When configuring the first supplementary service to the supplementary service the same as the second supplementary service, because the TAS does not automatically update the first supplementary service to the supplementary service the same as the second supplementary service, and the TAS can delete an old supplementary service only by receiving a deletion instruction sent by the mobile phone, and add a new supplementary service by receiving a supplementary service configuration request sent by the mobile phone, in this step, before the first supplementary service is configured, the first supplementary service saved in the TAS needs to be deleted first. If the first supplementary service in the TAS is not deleted before the first supplementary service is configured, after the configuration, in addition to the old first supplementary service before the configuration, the TAS further saves the new first supplementary service the same as the second supplementary service, causing an error to the supplementary service. In addition, after sending the first deletion instruction or a second deletion instruction to the TAS, the mobile phone may further receive a configuration acknowledgement response sent by the TAS.

It should be noted that after receiving the first deletion instruction, because the TAS currently may save the first supplementary service or may not save the first supplementary service, when the TAS currently saves the first supplementary service, the TAS deletes the first supplementary service currently saved in the TAS, and when the server currently does not save the first supplementary service, the TAS does not perform a deletion operation in this step.

403: The user equipment configures, by using the server, the first supplementary service to a supplementary service the same as the second supplementary service in the second mapping relationship.

In this step, the mobile phone sends the supplementary service configuration request to the TAS according to the saved second mapping relationship, to configure the first supplementary service to the supplementary service the same as the second supplementary service in the second mapping relationship, so that after the first telephone card is currently inserted into the mobile phone, the first telephone card corresponds to the previously configured supplementary service of the first telephone card, thereby ensuring that no error is caused to the supplementary service.

In this case, the supplementary service saved in the TAS may be shown in Table 8-2.

TABLE 8-2

| TAS | First supplementary service (S2) |
| --- | --- |

404: The user equipment updates the second mapping relationship to a third mapping relationship, where the third mapping relationship is a mapping relationship among the first IMSI, the first GRUU, and the first supplementary service.

After configuring the first supplementary service to the supplementary service the same as the second supplementary service in the second mapping relationship, the mobile phone may update the second mapping relationship to the third mapping relationship, so that after the mobile phone performs registration by using the first IMSI and obtains the second GRUU, the mobile phone may configure, according to the first supplementary service in the third mapping relationship, the second supplementary service to a supplementary service the same as the first supplementary service.

After the mapping relationship is updated, the correspondence saved in the mobile phone may be shown in Table 7-2.

TABLE 7-2

| Mobile phone | First IMSI, first GRUU, and first supplementary service (S2) |
| --- | --- |

405: The user equipment sends a second deletion instruction to the server, to instruct the server to delete the second supplementary service currently saved in the server.

Because the first GRUU is obtained after the first telephone card is registered, the TAS executes the supplementary service of the first telephone card according to the supplementary service corresponding to the first GRUU. Therefore, the mobile phone may send the second deletion instruction carrying the second GRUU to the TAS, to instruct the TAS to delete the second supplementary service currently saved in the TAS, and configure, according to the second mapping relationship saved in the mobile phone, the first supplementary service to the supplementary service the same as the second supplementary service. After the TAS deletes the currently saved second supplementary service, when the second telephone card is inserted into card slot 2 of the mobile phone and is registered next time and the second GRUU is obtained, an impact of the second supplementary service (the supplementary service of the first telephone card) currently saved in the TAS on the supplementary service of the second telephone card may be avoided. In addition, after sending the first deletion instruction or the second deletion instruction to the TAS, the mobile phone may further receive the configuration acknowledgement response sent by the TAS.

Figure 7:
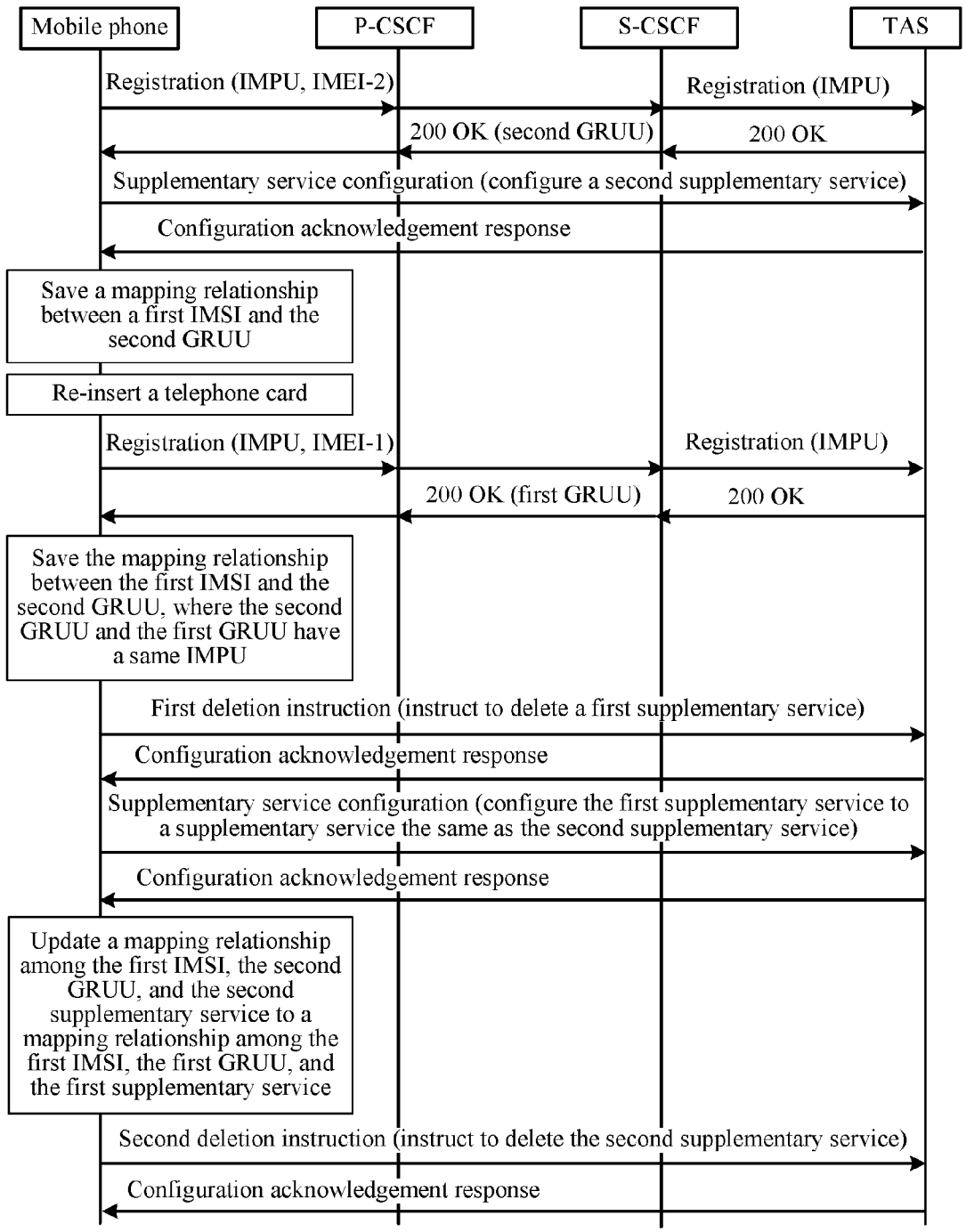
FIG. 7 is a flowchart of interaction between a mobile phone and a server in an IMS network according to another embodiment of the present disclosure.

In step 401 to step 405 in this embodiment of the present disclosure, for a flowchart of interaction among the mobile phone, a P-CSCF in the IMS network, an S-CSCF in the IMS network, and the TAS in the IMS network, refer to FIG. 7.

Figure 8:
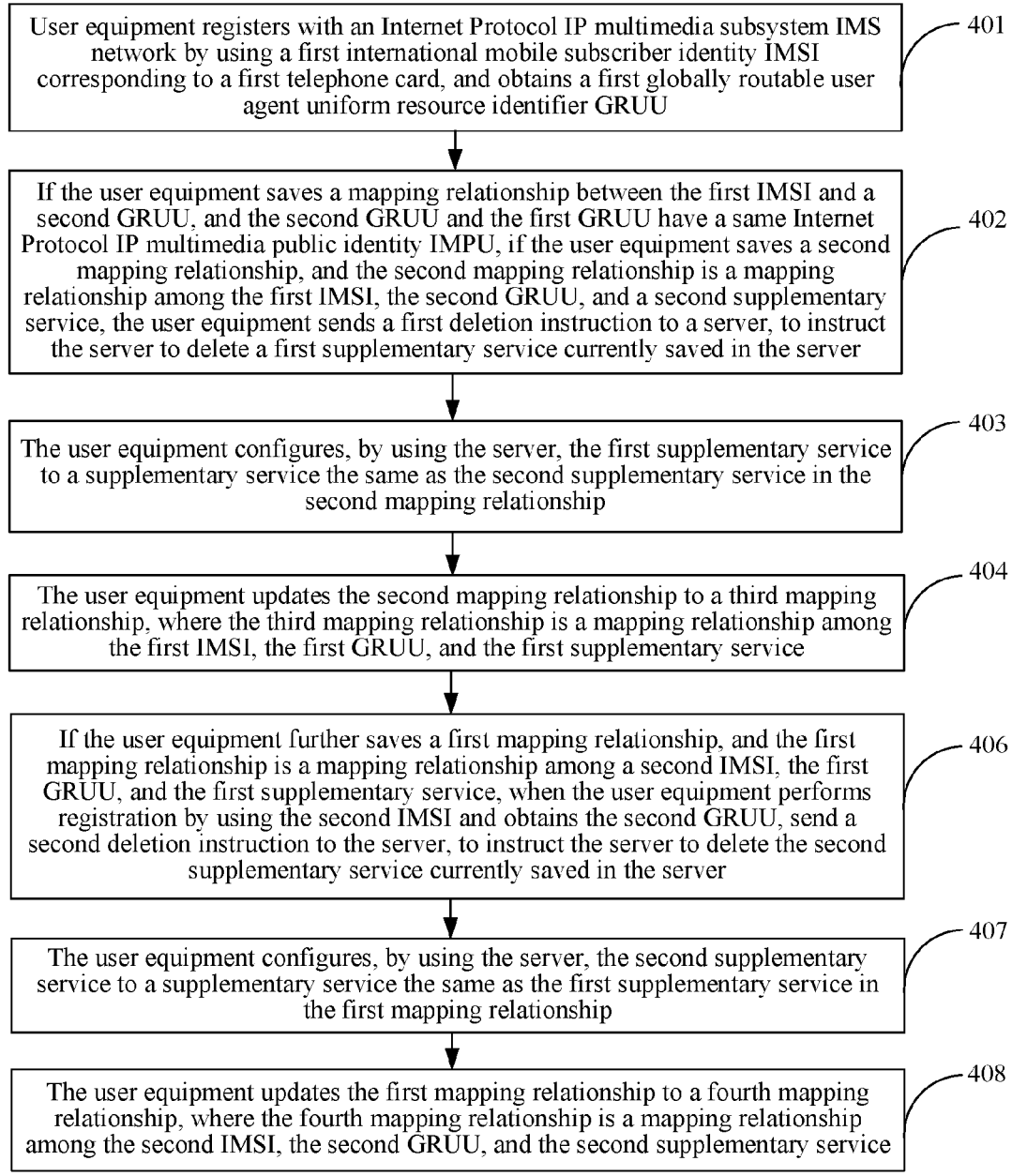
FIG. 8 is a flowchart of still another service processing method according to an embodiment of the present disclosure.

In addition, when the first telephone card is inserted into card slot 1, if the second telephone card (corresponding to the second IMSI) is further inserted into card slot 2, referring to FIG. 8, after step 401 to step 404, the method in this embodiment of the present disclosure may further include the following steps.

406: If the user equipment further saves a first mapping relationship, and the first mapping relationship is a mapping relationship among a second IMSI, the first GRUU, and the first supplementary service, when the user equipment performs registration by using the second IMSI and obtains the second GRUU, send a second deletion instruction to the server, to instruct the server to delete the second supplementary service currently saved in the server.

If the mobile phone further saves the mapping relationship among the second IMSI, the first GRUU, and the first supplementary service, it indicates that before the second telephone card is currently inserted into the mobile phone, the second telephone card is already registered, the first GRUU is obtained, and the first supplementary service is configured, that is, the GRUU corresponding to the second telephone card changes from the first GRUU to the second GRUU. Therefore, if the first GRUU and the second GRUU have a same IMPU, the second supplementary service needs to be configured to a supplementary service that is previously configured by the user and that is of the supplementary service, that is, the supplementary service the same as the first supplementary service, so that when the IMPU does not change, the second telephone card corresponds to the supplementary service of the second telephone card, thereby ensuring that no error is caused to the supplementary service of the second telephone card.

Because the TAS does not automatically update the second supplementary service to the supplementary service the same as the first supplementary service, and the TAS can delete an old supplementary service only by receiving a deletion instruction sent by the mobile phone, and add a new supplementary service by receiving a supplementary service configuration request sent by the mobile phone, in this step, before the second supplementary service is configured, the second supplementary service saved in the TAS needs to be deleted first. If the second supplementary service in the TAS is not deleted before the second supplementary service is configured, after the configuration, in addition to the old second supplementary service before the configuration, the TAS further saves the new second supplementary service the same as the first supplementary service, causing an error to the supplementary service.

407: The user equipment configures, by using the server, the second supplementary service to a supplementary service the same as the first supplementary service in the first mapping relationship.

After the TAS deletes the currently saved second supplementary service, the mobile phone may send a supplementary service configuration request to the server according to the second mapping relationship, to configure the second supplementary service to the supplementary service the same as the first supplementary service in the first mapping relationship, so that the second telephone card corresponds to the supplementary service that is previously configured by the user and that is of the second telephone card, thereby ensuring that no error is caused to the supplementary service of the second telephone card.

408: The user equipment updates the first mapping relationship to a fourth mapping relationship, where the fourth mapping relationship is a mapping relationship among the second IMSI, the second GRUU, and the second supplementary service.

After configuring the second supplementary service to the supplementary service the same as the first supplementary service, the mobile phone may further update the first mapping relationship to the fourth relationship, so that after the second telephone card is registered next time and the first GRUU is obtained, the mobile phone may configure, according to the fourth mapping relationship, the first supplementary service to the supplementary service the same as the second supplementary service in the fourth mapping relationship, thereby ensuring that no error is caused to the supplementary service of the second telephone card.

It should be noted that this embodiment of the present disclosure is described by using an example in which after the first GRUU is obtained in step 401, the mobile phone saves the mapping relationship between the first IMSI and the second GRUU, after the first GRUU is obtained in step 401, if the mobile phone does not save a mapping relationship between the first IMSI and any GRUU, and the GRUU includes the first GRUU and the second GRUU, the mobile phone may save a third mapping relationship when configuring the first supplementary service corresponding to the first IMSI, where the third mapping relationship is a mapping relationship among the first IMSI, the first GRUU, and the first supplementary service.

Specifically, after obtaining the first GRUU in step 401, if the mobile phone does not save the mapping relationship between the first IMSI and any GRUU, and the GRUU includes the first GRUU and the second GRUU, it indicates that the first telephone card is not inserted into the mobile phone previously. In this case, when configuring the first supplementary service corresponding to the first IMSI, the mobile phone may save the mapping relationship among the first IMSI, the first GRUU, and the first supplementary service for the first time, so as to update a mapping relationship among the first IMSI, the GRUU, and the supplementary service later.

Similarly, after the second telephone card is registered and the second GRUU is obtained, if the mobile phone does not save a mapping relationship between the second IMSI and any GRUU, and the GRUU includes the first GRUU and the second GRUU, that is, the second telephone card is not inserted into the mobile phone previously, when configuring the second supplementary service corresponding to the second IMSI, the mobile phone may save the mapping relationship between the second IMSI, the second GRUU, and the second supplementary service for the first time, so as to update a mapping relationship among the second IMSI, the GRUU, and the supplementary service.

In addition, the user equipment in this embodiment of the present disclosure is described by using an example in which the user equipment is the dual card mobile phone. Certainly, the user equipment in this embodiment of the present disclosure may be a multi-card mobile phone, or another user equipment having at least two card slots. This is not limited in this embodiment of the present disclosure.

In the service processing method provided in this embodiment of the present disclosure, after user equipment registers with an IMS network and obtains a first GRUU, if the user equipment saves a mapping relationship between a first IMSI and a second GRUU, it indicates that a first telephone card is already registered and the second GRUU is obtained, that is, a GRUU corresponding to the first telephone card changes from the second GRUU to the first GRUU. In this case, a supplementary service that corresponds to the second GRUU and that is saved in a server in the IMS network is a supplementary service that is previously configured by a user and that is of the first telephone card, but a supplementary service that corresponds to the first GRUU and that is saved in the server is not the supplementary service of the first telephone card. Therefore, if the second GRUU and the first GRUU have a same IMPU, the user equipment may configure the supplementary service corresponding to the first GRUU to a supplementary service the same as the supplementary service corresponding to the second GRUU. Therefore, when an IMPU does not change but an GRUU changes, the first telephone card that is registered and for which the first GRUU is obtained corresponds to the supplementary service that is previously configured by the user and that is of the first telephone card, thereby resolving a problem in the prior art that because when an IMPU does not change, a card slot into which a telephone card is inserted changes, and a corresponding GRUU changes, a supplementary service that corresponds to the changed GRUU and that is saved in a server does not correspond to the telephone card, a supplementary service error of the telephone card is caused.

Figure 9:
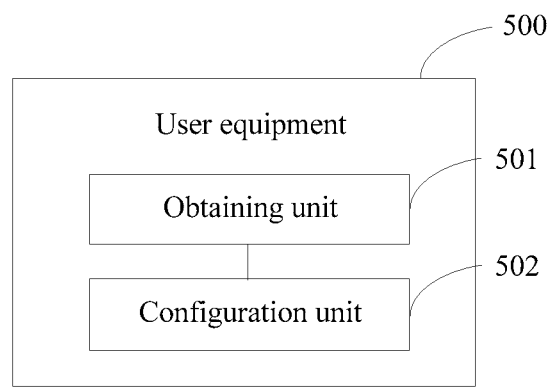
FIG. 9 is a schematic structural diagram of user equipment according to an embodiment of the present disclosure.

Referring to FIG. 9, an embodiment of the present disclosure provides user equipment 500, where the user equipment 500 may include:

an obtaining unit 501, configured to: register with an Internet Protocol IP multimedia subsystem IMS network by using a first international mobile subscriber identity IMSI corresponding to a first telephone card, and obtain a first globally routable user agent uniform resource identifier GRUU; and a configuration unit 502, configured to: after the obtaining unit 501 obtains the first GRUU, if the user equipment 500 saves a mapping relationship between the first IMSI and a second GRUU, and the second GRUU and the first GRUU have a same Internet Protocol IP multimedia public identity IMPU, configure a first supplementary service to a supplementary service the same as a second supplementary service.

The first supplementary service is a supplementary service corresponding to the first GRUU, and the second supplementary service is a supplementary service corresponding to the second GRUU.

The user equipment 500 may be a mobile phone having at least two card slots, a personal communication service phone, a Session Initiation Protocol phone, a personal digital assistant, or another portable, pocket-sized, handheld, and vehicle-mounted user equipment 500.

Specifically, the configuration unit 502 may be specifically configured to:

query a server for the second supplementary service and save the second supplementary service;

send a first deletion instruction to the server, to instruct the server to delete the first supplementary service currently saved in the server;

configure, by using the server according to the saved second supplementary service, the first supplementary service to the supplementary service the same as the second supplementary service; and delete the saved second supplementary service.

Figure 10:
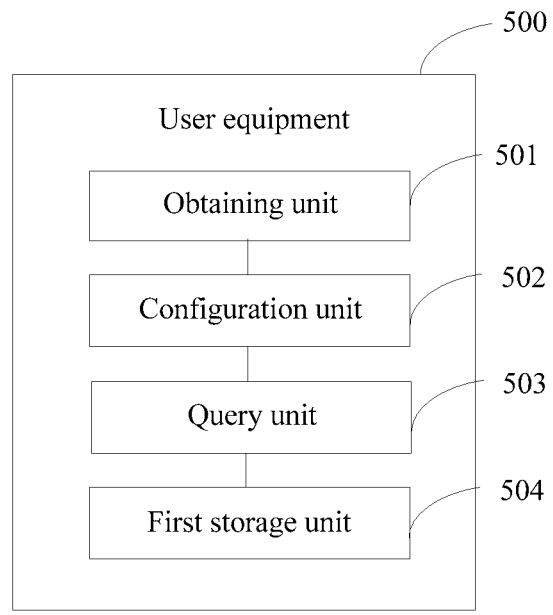
FIG. 10 is a schematic structural diagram of another user equipment according to an embodiment of the present disclosure.

Optionally, referring to FIG. 10, the user equipment 500 shown in FIG. 9 may further include:

a query unit 503, configured to: before the configuration unit 502 configures the first supplementary service to the supplementary service the same as the second supplementary service, if the user equipment 500 further saves a mapping relationship between a second IMSI corresponding to a second telephone card and the first GRUU, query the server for the first supplementary service; and a first storage unit 504, configured to: when the query unit 503 obtains through querying the first supplementary service, save a first mapping relationship, where the first mapping relationship is a mapping relationship among the second IMSI, the first GRUU, and the first supplementary service.

Figure 11:
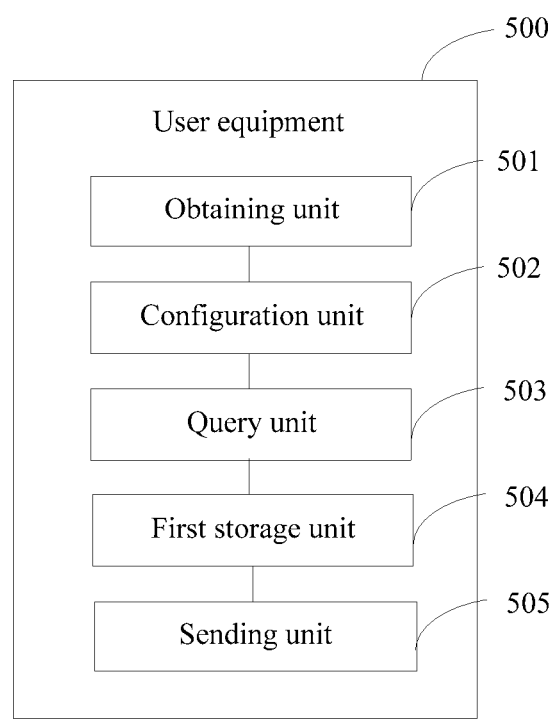
FIG. 11 is a schematic structural diagram of still another user equipment according to an embodiment of the present disclosure.

Optionally, referring to FIG. 11, the user equipment 500 shown in FIG. 10 may further include:

a sending unit 505, configured to: after the configuration unit 502 configures the first supplementary service to the supplementary service the same as the second supplementary service, if the user equipment 500 registers with the IMS network by using the second IMSI and obtains the second GRUU, send a second deletion instruction to the server, to instruct the server to delete the second supplementary service currently saved in the server, where the configuration unit 502 may be further configured to configure, by using the server, the second supplementary service to the supplementary service the same as the first supplementary service in the first mapping relationship.

Figure 12:
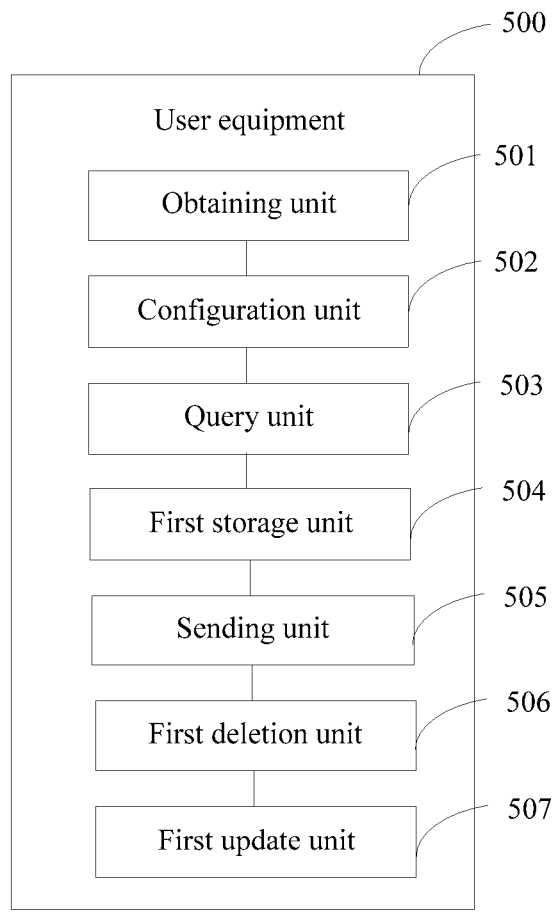
FIG. 12 is a schematic structural diagram of another user equipment according to an embodiment of the present disclosure.

Referring to FIG. 12, the user equipment 500 shown in FIG. 11 may further include:

a first deletion unit 506, configured to: after the configuration unit 502 configures the second supplementary service to a supplementary service the same as the first supplementary service in the first mapping relationship, delete the first supplementary service in the first mapping relationship; and a first update unit 507, configured to update the mapping relationship between the second IMSI and the first GRUU to a mapping relationship between the second IMSI and the second GRUU.

Figure 13:
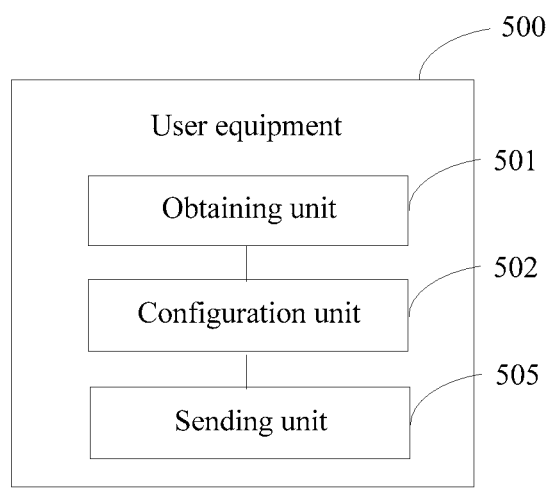
FIG. 13 is a schematic structural diagram of still another user equipment according to an embodiment of the present disclosure.
Figure 14:
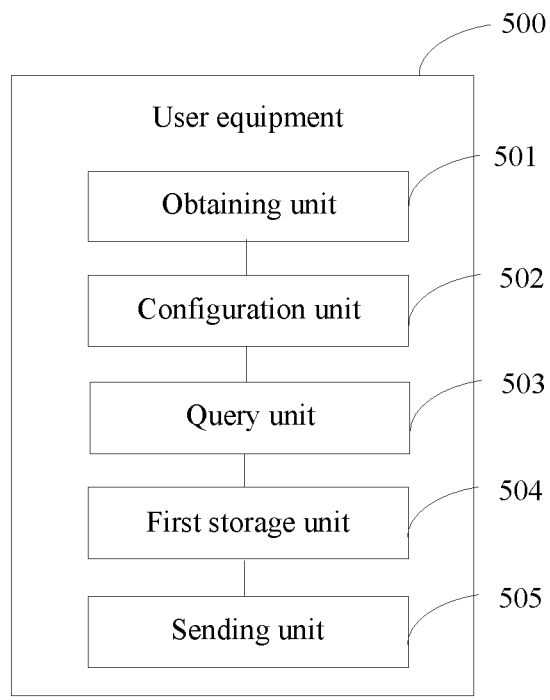
FIG. 14 is a schematic structural diagram of another user equipment according to an embodiment of the present disclosure.
Figure 15A:
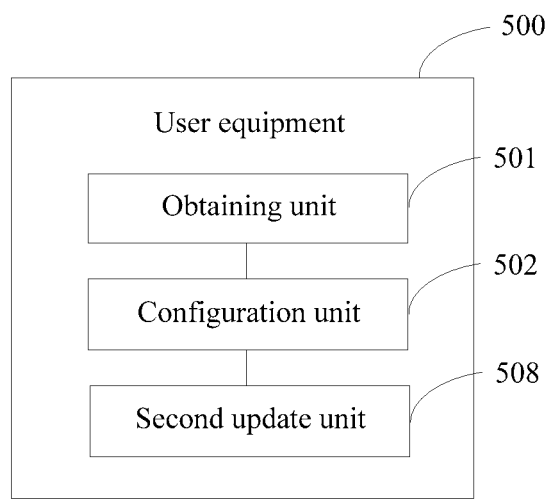
FIG. 15A is a schematic structural diagram of still another user equipment according to an embodiment of the present disclosure.
Figure 15B:
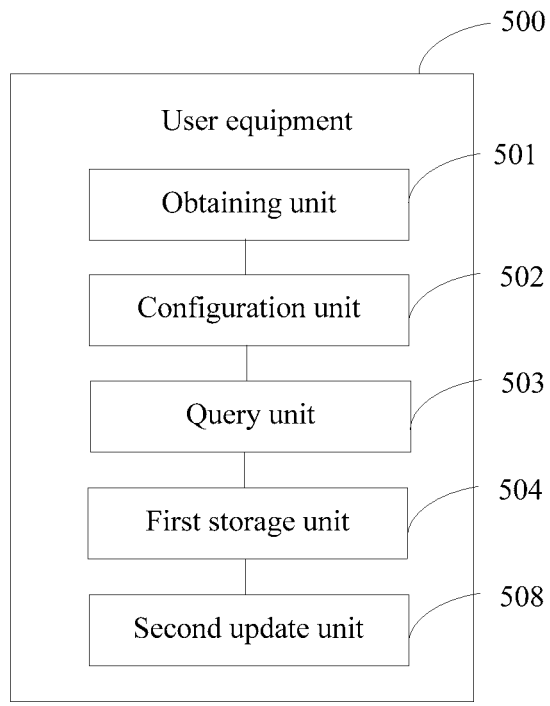
FIG. 15B is a schematic structural diagram of another user equipment according to an embodiment of the present disclosure.
Figure 15C:
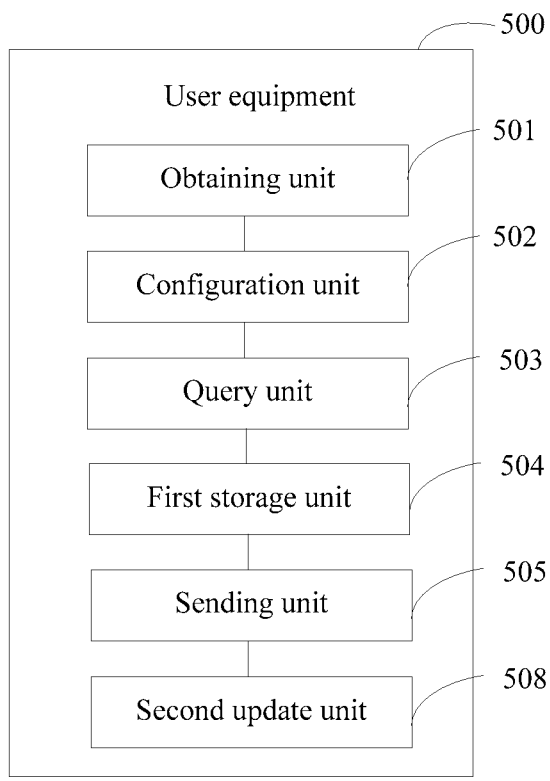
FIG. 15C is a schematic structural diagram of still another user equipment according to an embodiment of the present disclosure.
Figure 15D:
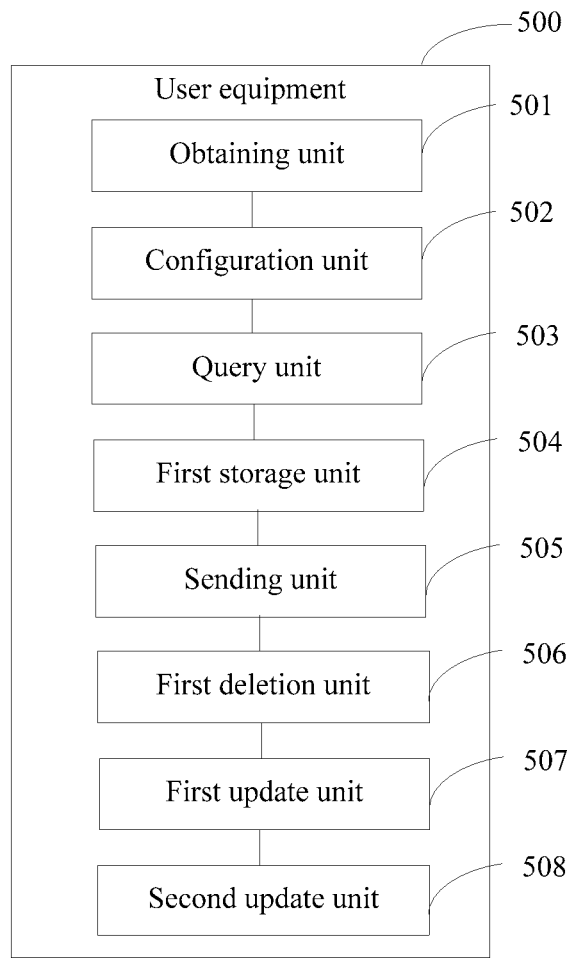
FIG. 15D is a schematic structural diagram of another user equipment according to an embodiment of the present disclosure.
Figure 15E:
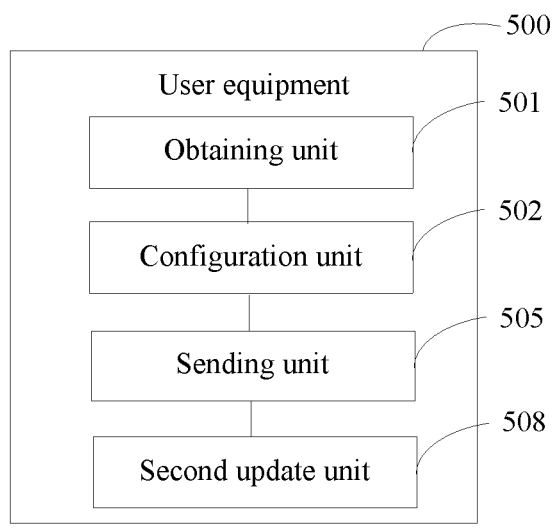
FIG. 15E is a schematic structural diagram of still another user equipment according to an embodiment of the present disclosure.
Figure 15F:
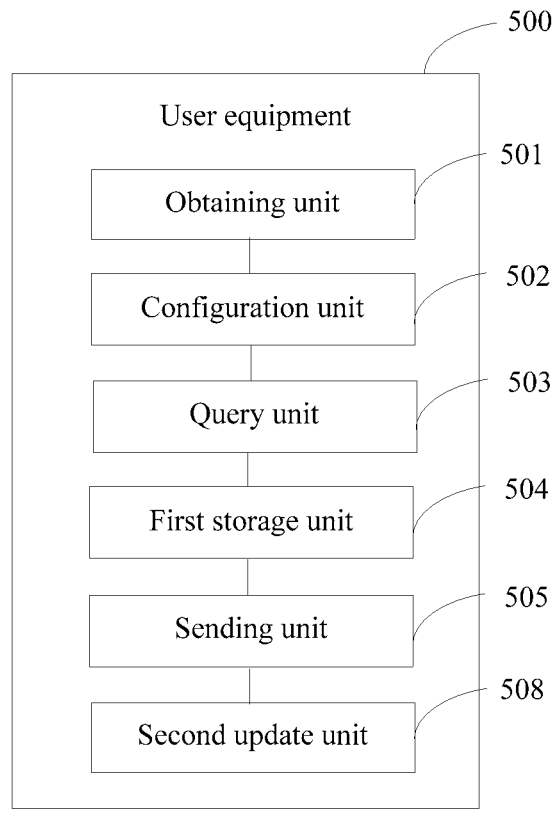
FIG. 15F is a schematic structural diagram of still another user equipment according to an embodiment of the present disclosure.

Optionally, referring to FIG. 13 or FIG. 14, the user equipment 500 shown in FIG. 9 or FIG. 10 may further include:

a sending unit 505, configured to: after the configuration unit 502 queries the server for the second supplementary service and saves the second supplementary service, send a second deletion instruction to the server, to instruct the server to delete the second supplementary service.

Optionally, referring to FIG. 15A, FIG. 15B, FIG. 15C, FIG. 15D, FIG. 15E, and FIG. 15F, the user equipment 500 shown in FIG. 9 to FIG. 14 may further include:

a second update unit 508, configured to update the mapping relationship between the first IMSI and the second GRUU to a mapping relationship between the first IMSI and the first GRUU.

Figure 16:
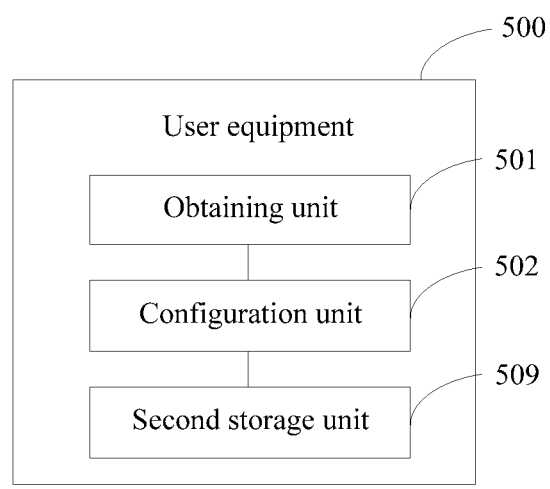
FIG. 16 is a schematic structural diagram of another user equipment according to an embodiment of the present disclosure.

Optionally, referring to FIG. 16, the user equipment 500 shown in FIG. 9 may further include:

a second storage unit 509, configured to: after the obtaining unit 501 obtains the first GRUU, if the user equipment 500 does not save a mapping relationship between the first IMSI and any GRUU, and the GRUU includes the first GRUU and the second GRUU, save a mapping relationship between the first IMSI and the first GRUU.

Optionally, in the user equipment 500 shown in FIG. 9, the configuration unit 502 may be specifically configured to:

if the user equipment 500 saves a second mapping relationship, and the second mapping relationship is a mapping relationship among the first IMSI, the second GRUU, and the second supplementary service, send a first deletion instruction to the server, to instruct the server to delete the first supplementary service currently saved in the server; and configure, by using the server, the first supplementary service to the supplementary service the same as the second supplementary service in the second mapping relationship.

Figure 17:
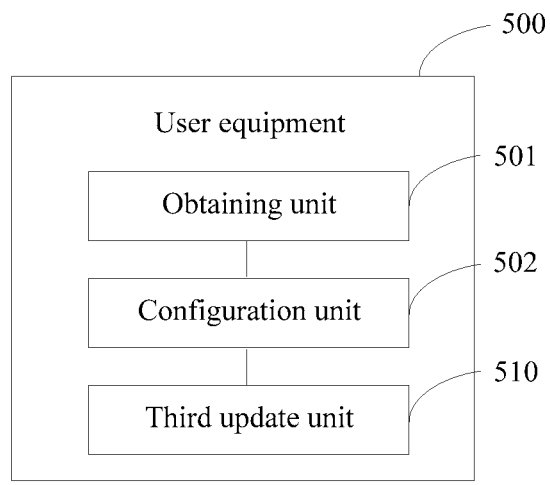
FIG. 17 is a schematic structural diagram of still another user equipment according to an embodiment of the present disclosure.

Optionally, referring to FIG. 17, the user equipment 500 shown in FIG. 9 may further include:

a third update unit 510, configured to: after the configuration unit 502 configures the first supplementary service to the supplementary service the same as the second supplementary service in the second mapping relationship, update the second mapping relationship to a third mapping relationship, where the third mapping relationship is a mapping relationship among the first IMSI, the first GRUU, and the first supplementary service.

Figure 18:
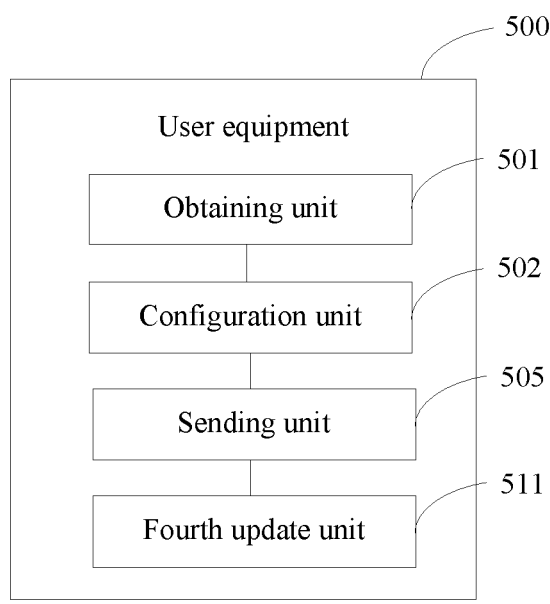
FIG. 18 is a schematic structural diagram of another user equipment according to an embodiment of the present disclosure.
Figure 19:
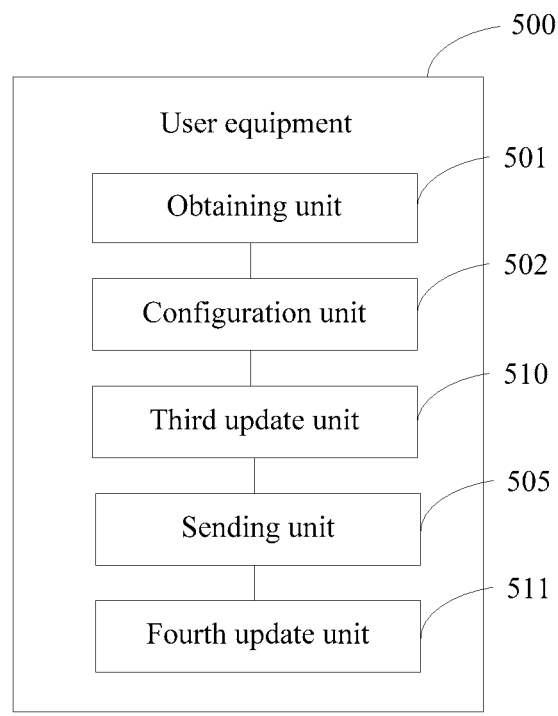
FIG. 19 is a schematic structural diagram of still another user equipment according to an embodiment of the present disclosure.

Optionally, referring to FIG. 18 or FIG. 19, the user equipment 500 shown in FIG. 9 or FIG. 17 may further include:

a sending unit 505, configured to: if the user equipment 500 further saves a first mapping relationship, and the first mapping relationship is a mapping relationship among a second IMSI, the first GRUU, and the first supplementary service, when the user equipment 500 performs registration by using the second IMSI and obtains the second GRUU, send a second deletion instruction to the server, to instruct the server to delete the second supplementary service currently saved in the server, where the configuration unit 502 may be further configured to configure, by using the server, the second supplementary service to the supplementary service the same as the first supplementary service in the first mapping relationship; and a fourth update unit 511, configured to update the first mapping relationship to a fourth mapping relationship, where the fourth mapping relationship is a mapping relationship among the second IMSI, the second GRUU, and the second supplementary service.

Figure 20:
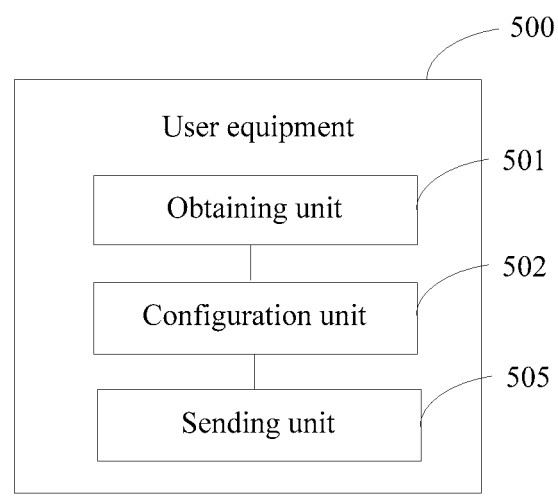
FIG. 20 is a schematic structural diagram of another user equipment according to an embodiment of the present disclosure.
Figure 21:
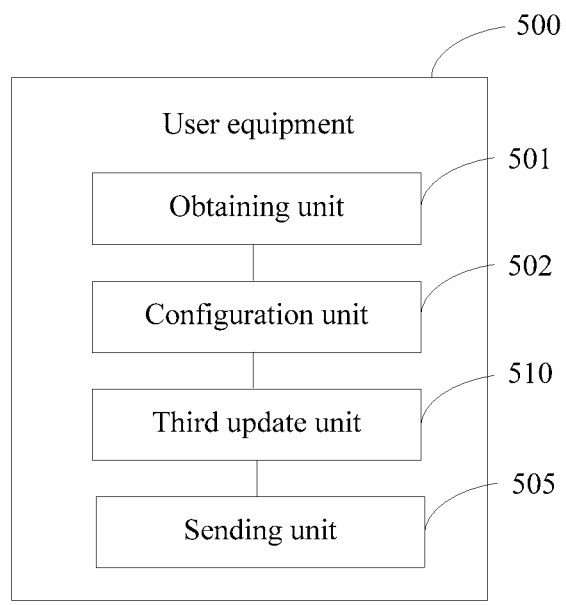
FIG. 21 is a schematic structural diagram of still another user equipment according to an embodiment of the present disclosure.

Optionally, referring to FIG. 20 or FIG. 21, the user equipment 500 shown in FIG. 9 or FIG. 17 may further include:

a sending unit 505, configured to send a second deletion instruction to the server, to instruct the server to delete the second supplementary service currently saved in the server.

Figure 22:
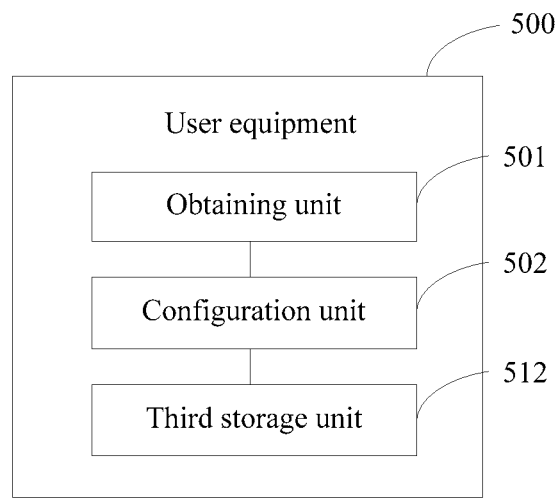
FIG. 22 is a schematic structural diagram of another user equipment according to an embodiment of the present disclosure.

Optionally, referring to FIG. 22, the user equipment 500 shown in FIG. 9 may further include:

a third storage unit 512, configured to: if the user equipment 500 does not save a mapping relationship between the first IMSI and any GRUU, and the GRUU includes the first GRUU and the second GRUU, when the user equipment 500 configures the first supplementary service corresponding to the first IMSI, save a third mapping relationship, where the third mapping relationship is a mapping relationship among the first IMSI, the first GRUU, and the first supplementary service.

In the user equipment 500 provided in this embodiment of the present disclosure, after the user equipment registers with an IMS network and obtains a first GRUU, if the user equipment 500 saves a mapping relationship between a first IMSI and a second GRUU, it indicates that a first telephone card is already registered and the second GRUU is obtained, that is, a GRUU corresponding to the first telephone card changes from the second GRUU to the first GRUU. In this case, a supplementary service that corresponds to the second GRUU and that is saved in a server in the IMS network is a supplementary service that is previously configured by a user and that is of the first telephone card, but a supplementary service that corresponds to the first GRUU and that is saved in the server is not the supplementary service of the first telephone card. Therefore, if the second GRUU and the first GRUU have a same IMPU, the user equipment 500 may configure the supplementary service corresponding to the first GRUU to a supplementary service the same as the supplementary service corresponding to the second GRUU. Therefore, when an IMPU does not change but an GRUU changes, the first telephone card that is registered and for which the first GRUU is obtained corresponds to the supplementary service that is previously configured by the user and that is of the first telephone card, thereby resolving a problem in the prior art that because when an IMPU does not change, a card slot into which a telephone card is inserted changes, and a corresponding GRUU changes, a supplementary service that corresponds to the changed GRUU and that is saved in a server does not correspond to the telephone card, a supplementary service error of the telephone card is caused.

Figure 23:
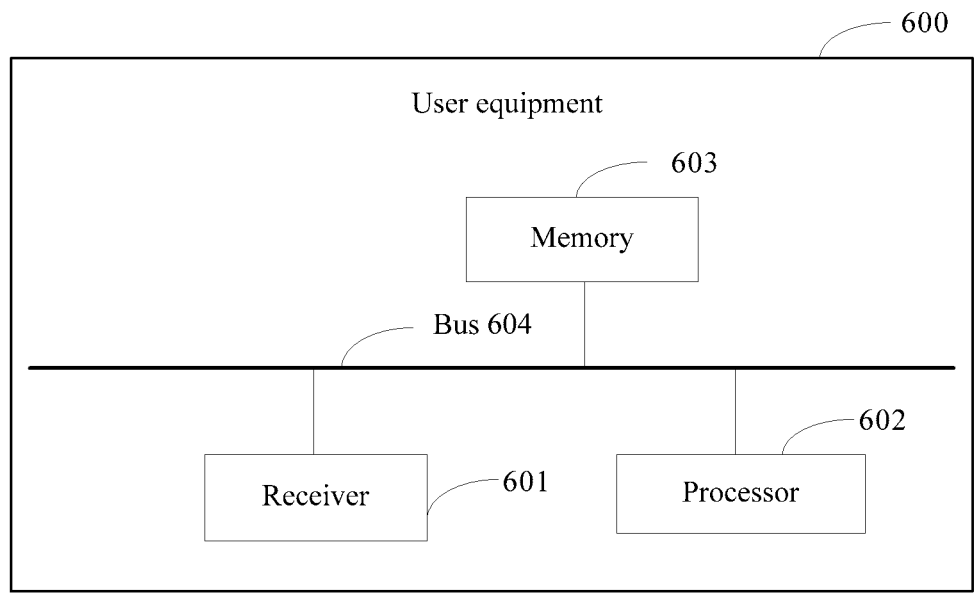
FIG. 23 is a schematic structural diagram of still another user equipment according to an embodiment of the present disclosure.

Referring to FIG. 23, an embodiment of the present disclosure provides user equipment 600. The user equipment 600 may include a bus 604, and a receiver 601, a processor 602, and a memory 603 that are connected to the bus 604. The memory 603 may be configured to save an instruction and data. The receiver 601 may be configured to: after the user equipment 600 registers with an Internet Protocol IP multimedia subsystem IMS network by using a first international mobile subscriber identity IMSI corresponding to a first telephone card, receive a first globally routable user agent uniform resource identifier GRUU sent by a server in the IMS network. The processor 602 may be configured to: after the receiver 601 receives the first GRUU, if the user equipment 600 saves a mapping relationship between the first IMSI and a second GRUU, and the second GRUU and the first GRUU have a same Internet Protocol IP multimedia public identity IMPU, configure a first supplementary service to a supplementary service the same as a second supplementary service, where the first supplementary service is a supplementary service corresponding to the first GRUU, and the second supplementary service is a supplementary service corresponding to the second GRUU.

The user equipment 600 may be a mobile phone having at least two card slots, a personal communication service phone, a Session Initiation Protocol phone, a personal digital assistant, or another portable, pocket-sized, handheld, and vehicle-mounted user equipment 600.

Optionally, that the processor 602 executes the instruction to configure the first supplementary service to the supplementary service the same as the second supplementary service may include:

querying a server for the second supplementary service and saving the second supplementary service;

sending a first deletion instruction to the server, to instruct the server to delete the first supplementary service currently saved in the server;

configuring, by using the server according to the saved second supplementary service, the first supplementary service to the supplementary service the same as the second supplementary service; and deleting the saved second supplementary service.

Optionally, the processor 602 may be further configured to:

before configuring the first supplementary service to the supplementary service the same as the second supplementary service, if the user equipment 600 further saves a mapping relationship between a second IMSI corresponding to a second telephone card and the first GRUU, query the server for the first supplementary service; and save a first mapping relationship, where the first mapping relationship is a mapping relationship among the second IMSI, the first GRUU, and the first supplementary service.

Figure 24:
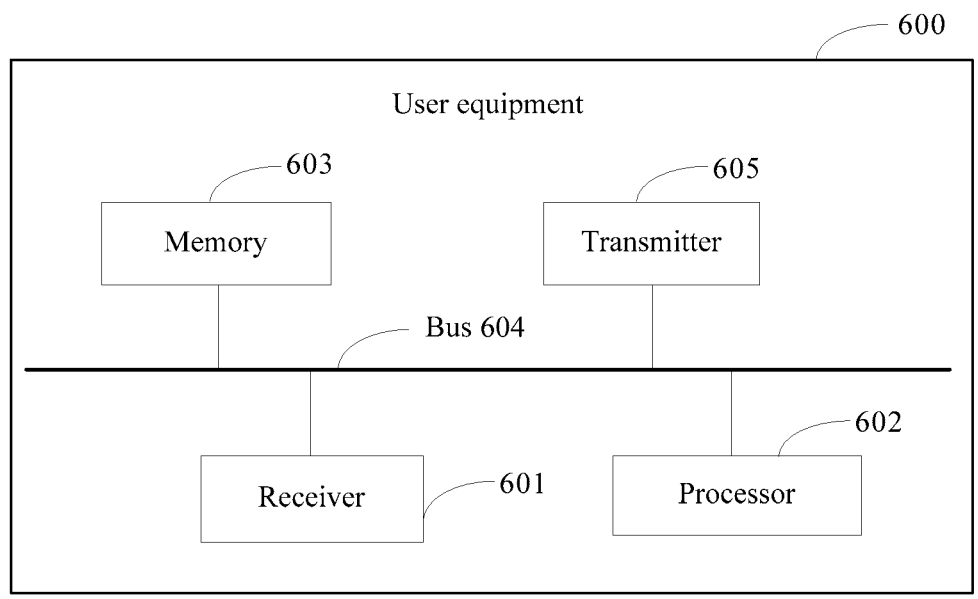
FIG. 24 is a schematic structural diagram of another user equipment according to an embodiment of the present disclosure.

Optionally, referring to FIG. 24, the user equipment 600 shown in FIG. 23 may further include:

a transmitter 605, configured to: after the processor 602 configures the first supplementary service to the supplementary service the same as the second supplementary service, if the user equipment 600 registers with the IMS network by using the second IMSI and obtains the second GRUU, send a second deletion instruction to the server, to instruct the server to delete the second supplementary service currently saved in the server, where the processor 602 may be further configured to configure, by using the server, the second supplementary service to the supplementary service the same as the first supplementary service in the first mapping relationship.

Optionally, the processor 602 may be further configured to:

after configuring the second supplementary service to the supplementary service the same as the first supplementary service in the first mapping relationship, delete the first supplementary service in the first mapping relationship; and update the mapping relationship between the second IMSI and the first GRUU to a mapping relationship between the second IMSI and the second GRUU.

Optionally, referring to FIG. 24, the user equipment 600 shown in FIG. 23 may further include:

a transmitter 605, configured to: after the processor 602 queries the server for the second supplementary service and saves the second supplementary service, send a second deletion instruction to the server, to instruct the server to delete the second supplementary service.

Optionally, in the user equipment 600 shown in FIG. 23 or FIG. 24, the processor 602 may be further configured to:

update the mapping relationship between the first IMSI and the second GRUU to a mapping relationship between the first IMSI and the first GRUU.

Optionally, in the user equipment 600 shown in FIG. 23, the processor 602 may be further configured to: after the receiver 601 receives the first GRUU, if the user equipment 600 does not save a mapping relationship between the first IMSI and any GRUU, and the GRUU includes the first GRUU and the second GRUU, save the mapping relationship between the first IMSI and the first GRUU.

Optionally, in the user equipment 600 shown in FIG. 23, that the processor 602 executes the instruction to configure the first supplementary service to the supplementary service the same as the second supplementary service may include:

if the user equipment 600 saves a second mapping relationship, and the second mapping relationship is a mapping relationship among the first IMSI, the second GRUU, and the second supplementary service, send a first deletion instruction to the server, to instruct the server to delete the first supplementary service currently saved in the server; and configure, by using the server, the first supplementary service to the supplementary service the same as the second supplementary service in the second mapping relationship.

Optionally, the processor 602 may be further configured to:

after configuring the first supplementary service to the supplementary service the same as the second supplementary service in the second mapping relationship, update the second mapping relationship to a third mapping relationship, where the third mapping relationship is a mapping relationship among the first IMSI, the first GRUU, and the first supplementary service.

Optionally, referring to FIG. 24, the user equipment 600 shown in FIG. 23 may further include:

a transmitter 605, configured to: if the user equipment 600 further saves a first mapping relationship, and the first mapping relationship is a mapping relationship among a second IMSI, the first GRUU, and the first supplementary service, when the user equipment 600 performs registration by using the second IMSI and obtains the second GRUU, send a second deletion instruction to the server, to instruct the server to delete the second supplementary service currently saved in the server, where the processor 602 may be further configured to configure, by using the server, the second supplementary service to the supplementary service the same as the first supplementary service in the first mapping relationship; and update the first mapping relationship to a fourth mapping relationship, where the fourth mapping relationship is a mapping relationship among the second IMSI, the second GRUU, and the second supplementary service.

Optionally, referring to FIG. 24, the user equipment 600 shown in FIG. 23 may further include:

a transmitter 605, configured to send a second deletion instruction to the server, to instruct the server to delete the second supplementary service currently saved in the server.

Optionally, in the user equipment 600 shown in FIG. 23, the processor 602 may be further configured to:

if the user equipment 600 does not save a mapping relationship between the first IMSI and any GRUU, and the GRUU includes the first GRUU and the second GRUU, when the user equipment 600 configures the first supplementary service corresponding to the first IMSI, save a third mapping relationship, where the third mapping relationship is a mapping relationship among the first IMSI, the first GRUU, and the first supplementary service.

In the user equipment 600 provided in this embodiment of the present disclosure, after the user equipment registers with an IMS network and obtains a first GRUU, if the user equipment 600 saves a mapping relationship between a first IMSI and a second GRUU, it indicates that a first telephone card is already registered and the second GRUU is obtained, that is, a GRUU corresponding to the first telephone card changes from the second GRUU to the first GRUU. In this case, a supplementary service that corresponds to the second GRUU and that is saved in a server in the IMS network is a supplementary service that is previously configured by a user and that is of the first telephone card, but a supplementary service that corresponds to the first GRUU and that is saved in the server is not the supplementary service of the first telephone card. Therefore, if the second GRUU and the first GRUU have a same IMPU, the user equipment 600 may configure the supplementary service corresponding to the first GRUU to a supplementary service the same as the supplementary service corresponding to the second GRUU. Therefore, when an IMPU does not change but an GRUU changes, the first telephone card that is registered and for which the first GRUU is obtained corresponds to the supplementary service that is previously configured by the user and that is of the first telephone card, thereby resolving a problem in the prior art that because when an IMPU does not change, a card slot into which a telephone card is inserted changes, and a corresponding GRUU changes, a supplementary service that corresponds to the changed GRUU and that is saved in a server does not correspond to the telephone card, a supplementary service error of the telephone card is caused.

In the several embodiments provided in the present application, it should be understood that the disclosed user equipment and method may be implemented in other manners. For example, the described user equipment embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the user equipment and systems in the embodiments of the present disclosure may be integrated into one processing unit, or each of the units may exist alone physically, or two or more units are integrated into one unit. The units may be implemented in a form of hardware, or may be implemented in a form of hardware in addition to a software functional unit.

All or some of the steps of the method embodiments may be implemented by a program instructing relevant hardware. The program may be saved in a computer-readable storage medium. When the program runs, the steps of the method embodiments are performed. The foregoing storage medium includes: any medium that can save program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A service processing method, wherein the method is applied to user equipment comprising at least one telephone card, and the method comprises:
    registering, by user equipment, with an Internet Protocol (IP) multimedia subsystem (IMS) network by using a first international mobile subscriber identity (IMSI) corresponding to a first telephone card, and obtaining a first globally routable user agent uniform resource identifier (GRUU); and
    configuring, by the user equipment, a first supplementary service to be the same as a second supplementary service if a mapping relationship between the first IMSI and a second GRUU is saved in the user equipment, and the second GRUU and the first GRUU have a same IP multimedia public identity (IMPU),
    wherein the first supplementary service is a supplementary service corresponding to the first GRUU, and the second supplementary service is a supplementary service corresponding to the second GRUU.

2. The method according to claim 1, wherein configuring, by the user equipment, a first supplementary service to be the same as a second supplementary service comprises:
    querying, by the user equipment, a server for the second supplementary service, and saving the second supplementary service;
    sending, by the user equipment, a first deletion instruction to the server, for instructing the server to delete the first supplementary service currently saved in the server;
    configuring, by the user equipment by using the server according to the saved second supplementary service, the first supplementary service to be the same as the second supplementary service; and
    deleting, by the user equipment, the saved second supplementary service.

3. The method according to claim 2, wherein after querying, by the user equipment, a server for the second supplementary service, and saving the second supplementary service, the method further comprises:
    sending, by the user equipment, a second deletion instruction to the server, for instructing the server to delete the second supplementary service.

4. The method according to claim 1, wherein before configuring, by the user equipment, a first supplementary service to be the same as a second supplementary service, the method further comprises:
    querying a server for the first supplementary service if a mapping relationship between a second IMSI corresponding to a second telephone card and the first GRUU is saved in the user equipment; and
    saving, by the user equipment, a first mapping relationship, wherein the first mapping relationship is a mapping relationship among the second IMSI, the first GRUU, and the first supplementary service.

5. The method according to claim 4, wherein after configuring, by the user equipment, a first supplementary service to be the same as a second supplementary service, the method further comprises:
    sending, by the user equipment, a second deletion instruction to the server, for instructing the server to delete the second supplementary service currently saved in the server if the user equipment registers with the IMS network by using the second IMSI, and obtains the second GRUU; and
    configuring, by the user equipment by using the server, the second supplementary service to be the same as the first supplementary service in the first mapping relationship.

6. The method according to claim 5, wherein the method further comprises:
    after configuring the second supplementary service to be the same as the first supplementary service in the first mapping relationship, deleting, by the user equipment, the first supplementary service in the first mapping relationship; and
    updating, by the user equipment, the mapping relationship between the second IMSI and the first GRUU to a mapping relationship between the second IMSI and the second GRUU.

7. The method according claim 1, wherein the method further comprises:
    updating, by the user equipment, the mapping relationship between the first IMSI and the second GRUU to a mapping relationship between the first IMSI and the first GRUU.

8. The method according to claim 1, wherein after obtaining, by user equipment, a first GRUU, the method further comprises:
    saving, by the user equipment, a mapping relationship between the first IMSI and the first GRUU if a mapping relationship between the first IMSI and any GRUU is not saved in the user equipment, and the GRUU comprises the first GRUU and the second GRUU.

9. The method according to claim 1, wherein configuring, by the user equipment, a first supplementary service to be the same as a second supplementary service comprises:
    sending, by the user equipment, a first deletion instruction to a server, to instruct the server to delete the first supplementary service currently saved in the server if a second mapping relationship is saved in the user equipment, and the second mapping relationship is a mapping relationship among the first IMSI, the second GRUU, and the second supplementary service; and configuring, by the user equipment by using the server, the first supplementary service to be the same as the second supplementary service in the second mapping relationship.

10. The method according to claim 9, wherein after configuring, by the user equipment, the first supplementary service to be the same as the second supplementary service in the second mapping relationship, the method further comprises:
updating, by the user equipment, the second mapping relationship to a third mapping relationship, wherein the third mapping relationship is a mapping relationship among the first IMSI, the first GRUU, and the first supplementary service.

11. The method according to claim 9, wherein the method further comprises:
if a first mapping relationship is saved in the user equipment, and the first mapping relationship is a mapping relationship among a second IMSI, the first GRUU, and the first supplementary service, when the user equipment performs registration by using the second IMSI and obtains the second GRUU, sending a second deletion instruction to the server, for instructing the server to delete the second supplementary service currently saved in the server;
configuring, by the user equipment by using the server, the second supplementary service to be the same as the first supplementary service in the first mapping relationship; and
updating, by the user equipment, the first mapping relationship to a fourth mapping relationship, wherein the fourth mapping relationship is a mapping relationship among the second IMSI, the second GRUU, and the second supplementary service.

12. The method according to claim 9, wherein the method further comprises:
sending, by the user equipment, a second deletion instruction to the server, for instructing the server to delete the second supplementary service currently saved in the server.

13. The method according to claim 1, wherein if a mapping relationship between the first IMSI and any GRUU is not saved in the user equipment, and the GRUU comprises the first GRUU and the second GRUU, the method further comprises:
when configuring the first supplementary service corresponding to the first IMSI, saving a third mapping relationship, wherein the third mapping relationship is a mapping relationship among the first IMSI, the first GRUU, and the first supplementary service.

14. User equipment, comprising:
a receiver, configured to: after the user equipment registers with an Internet Protocol (IP) multimedia subsystem (IMS) network by using a first international mobile subscriber identity (IMSI) corresponding to a first telephone card, receive a first globally routable user agent uniform resource identifier (GRUU) sent by a server in the IMS network; and
a processor, configured to: after the receiver receives the first GRUU, configure a first supplementary service to be the same as a second supplementary service if a mapping relationship between the first IMSI and a second GRUU is saved in the user equipment, and the second GRUU and the first GRUU have a same IP multimedia public identity (IMPU),
wherein the first supplementary service is a supplementary service corresponding to the first GRUU, and the second supplementary service is a supplementary service corresponding to the second GRUU.

15. The user equipment according to claim 14, wherein the processor is further configured to:
query the server for the second supplementary service and save the second supplementary service;
send a first deletion instruction to the server, for instructing the server to delete the first supplementary service currently saved in the server;
configure, by using the server according to the saved second supplementary service, the first supplementary service to be the same as the second supplementary service; and
delete the saved second supplementary service.

16. The user equipment according to claim 15, further comprising:
a transmitter, configured to: after the processor queries the server for the second supplementary service and saves the second supplementary service, send a second deletion instruction to the server, for instructing the server to delete the second supplementary service.

17. The user equipment according to claim 14, wherein the processor is further configured to:
before configuring the first supplementary service to be the same as the second supplementary service, query the server for the first supplementary service if a mapping relationship between a second IMSI corresponding to a second telephone card and the first GRUU is saved in the user equipment; and
save a first mapping relationship, wherein the first mapping relationship is a mapping relationship among the second IMSI, the first GRUU, and the first supplementary service.

18. The user equipment according to claim 17, further comprising:
a transmitter, configured to: after the processor configures the first supplementary service to be the same as the second supplementary service, send a second deletion instruction to the server, for instructing the server to delete the second supplementary service currently saved in the server if the user equipment registers with the IMS network by using the second IMSI and obtains the second GRUU,
wherein the processor is further configured to configure, by using the server, the second supplementary service to be the same as the first supplementary service in the first mapping relationship.

19. The user equipment according to claim 18, wherein the processor is further configured to:
after configuring the second supplementary service to be the same as the first supplementary service in the first mapping relationship, delete the first supplementary service in the first mapping relationship; and
update the mapping relationship between the second IMSI and the first GRUU to a mapping relationship between the second IMSI and the second GRUU.

20. The user equipment according to claim 14, wherein the processor is further configured to:
update the mapping relationship between the first IMSI and the second GRUU to a mapping relationship between the first IMSI and the first GRUU.

\* \* \* \* \*